US009179708B2

(12) United States Patent
Garrett et al.

(10) Patent No.: US 9,179,708 B2
(45) Date of Patent: *Nov. 10, 2015

(54) APPARATUSES, SYSTEMS, AND ASSOCIATED METHODS FOR FORMING POROUS MASSES FOR SMOKE FILTER

(71) Applicant: Celanese Acetate LLC, Dallas, TX (US)

(72) Inventors: Thomas S. Garrett, Narrows, VA (US); Zeming Gou, Tampa, FL (US); Lawton E. Kizer, Blacksburg, VA (US); Raymond M. Robertson, Blacksburg, VA (US)

(73) Assignee: Celanese Acetate LLC, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,281

(22) Filed: Apr. 1, 2013

(65) Prior Publication Data
US 2013/0221563 A1 Aug. 29, 2013

Related U.S. Application Data

(63) Continuation of application No. 13/877,027, filed as application No. PCT/US2011/056388 on Oct. 14, 2011.

(60) Provisional application No. 61/393,378, filed on Oct. 15, 2010.

(51) Int. Cl.
B29B 11/16 (2006.01)
A24D 3/02 (2006.01)
(Continued)

(52) U.S. Cl.
CPC .................. *A24D 3/062* (2013.01); *A24D 3/00* (2013.01); *A24D 3/0229* (2013.01);
(Continued)

(58) Field of Classification Search
USPC ......... 131/280, 331–334, 339, 341, 342, 345; 493/39–50; 977/734, 753, 778, 779, 977/793, 811, 903; 264/118, 122, 125, 126, 264/165, 166; 425/112, 122, 308, 404
See application file for complete search history.

(56) References Cited

U.S. PATENT DOCUMENTS 2,957,285 A * 10/1960 Molins ........................... 493/47
3,217,715 A 11/1965 Berger et al.
(Continued)

FOREIGN PATENT DOCUMENTS

CA 2330782 A1 7/2002
CN 101642287 A 2/2010
(Continued)

OTHER PUBLICATIONS

Official Action for Chinese Patent Application No. 201310273059.3 dated May 5, 2014.
(Continued)

Primary Examiner — Dennis Cordray
(74) Attorney, Agent, or Firm — McDermott Will & Emery LLP; Kurt Jones

(57) ABSTRACT

A system for producing porous masses may include a mold cavity disposed along the material path, at least one hopper before at least a portion of the mold cavity for feeding a matrix material to the material path, a heat source in thermal communication with at least a first portion of the material path, and a cutter disposed along the material path after the first portion of the material path.

20 Claims, 11 Drawing Sheets

(51) Int. Cl.
  *A24D 3/00* (2006.01)
  *A24D 3/06* (2006.01)
  *B82Y 30/00* (2011.01)

(52) U.S. Cl.
  CPC ........... *A24D 3/0233* (2013.01); *A24D 3/0237* (2013.01); *A24D 3/0241* (2013.01); *A24D 3/066* (2013.01); *B29B 11/16* (2013.01); *B82Y 30/00* (2013.01)

(56) References Cited

U.S. PATENT DOCUMENTS

| | | |
|---|---|---|
| 3,318,317 A | 5/1967 | Sproull et al. |
| 3,353,543 A | 11/1967 | Sproull et al. |
| 3,400,032 A | 9/1968 | Sexstone et al. |
| 3,403,202 A | 9/1968 | Green |
| 3,409,020 A | 11/1968 | Westbrook et al. |
| 3,474,600 A | 10/1969 | Tobias |
| 3,483,331 A | 12/1969 | Hasser |
| 3,516,885 A * | 6/1970 | Sexstone et al. ............ 156/203 |
| 3,531,558 A | 9/1970 | Ganz |
| 3,648,711 A | 3/1972 | Berger et al. |
| 3,807,286 A | 4/1974 | Sexstone |
| 4,090,424 A | 5/1978 | Hall |
| 4,257,754 A | 3/1981 | Green et al. |
| 4,261,373 A | 4/1981 | Tamaoki et al. |
| 4,379,465 A | 4/1983 | Coq |
| 4,516,589 A | 5/1985 | Rainer et al. |
| 4,664,683 A | 5/1987 | Degen et al. |
| 4,753,728 A | 6/1988 | VanderBilt et al. |
| 4,807,647 A | 2/1989 | Hayes |
| 5,047,180 A | 9/1991 | Steiner et al. |
| 5,064,949 A | 11/1991 | Steiner et al. |
| 5,423,336 A | 6/1995 | Mentzel et al. |
| 6,010,588 A | 1/2000 | Stahl et al. |
| 6,080,457 A | 6/2000 | Charlton et al. |
| 6,145,511 A | 11/2000 | Teufel et al. |
| 6,225,812 B1 | 5/2001 | Mays et al. |
| 6,762,139 B2 | 7/2004 | Strommen |
| 6,770,736 B1 | 8/2004 | Haftka et al. |
| 6,989,101 B2 * | 1/2006 | Cumberland et al. ........ 210/660 |
| 7,018,582 B2 | 3/2006 | Lewis |
| 7,049,382 B2 | 5/2006 | Haftka et al. |
| 7,112,280 B2 | 9/2006 | Hughes et al. |
| 7,141,636 B1 | 11/2006 | Ehlers et al. |
| 7,160,453 B1 | 1/2007 | Matsumura et al. |
| 7,293,661 B2 | 11/2007 | Saaski et al. |
| 7,806,817 B2 | 10/2010 | Day et al. |
| 8,047,977 B2 | 11/2011 | Lauenstein et al. |
| 9,027,566 B2 | 5/2015 | Garrett et al. |
| 2002/0153017 A1 | 10/2002 | Georgitsis et al. |
| 2002/0166564 A1* | 11/2002 | Sung ............................ 131/334 |
| 2004/0043717 A1 | 3/2004 | Shefet |
| 2004/0043718 A1 | 3/2004 | Shefet |
| 2004/0046289 A1 | 3/2004 | Stadermann et al. |
| 2004/0194792 A1 | 10/2004 | Zhuang et al. |
| 2004/0235631 A1 | 11/2004 | Buhl et al. |
| 2004/0250822 A1 | 12/2004 | Gosebruch |
| 2004/0250827 A1 | 12/2004 | Deevi et al. |
| 2005/0004299 A1 | 1/2005 | Haftka et al. |
| 2005/0133052 A1 | 6/2005 | Fournier et al. |
| 2005/0199251 A1 | 9/2005 | Wonowidjojo et al. |
| 2006/0086366 A1 | 4/2006 | Xue et al. |
| 2006/0130856 A1 | 6/2006 | McCormack |
| 2006/0174902 A1* | 8/2006 | Zhou et al. .................... 131/352 |
| 2007/0095358 A1 | 5/2007 | Li et al. |
| 2007/0225390 A1 | 9/2007 | Wang et al. |
| 2008/0090081 A1 | 4/2008 | Matsumoto et al. |
| 2008/0173320 A1 | 7/2008 | Dunlap et al. |
| 2008/0264594 A1 | 10/2008 | Lohmueller et al. |
| 2009/0288671 A1 | 11/2009 | White et al. |
| 2010/0125039 A1 | 5/2010 | Banerjee et al. |
| 2010/0147317 A1 | 6/2010 | Fallon |
| 2010/0176068 A1 | 7/2010 | Dallas et al. |
| 2011/0162667 A1 | 7/2011 | Burke et al. |
| 2013/0030340 A1 | 1/2013 | Vincent et al. |
| 2013/0214447 A1 | 8/2013 | Garrett et al. |
| 2013/0221562 A1 | 8/2013 | Garrett et al. |
| 2013/0221563 A1 | 8/2013 | Garrett et al. |
| 2013/0239983 A1 | 9/2013 | Burke et al. |
| 2013/0298923 A1 | 11/2013 | Garrett et al. |
| 2014/0007893 A1 | 1/2014 | Burke et al. |
| 2014/0070465 A1 | 3/2014 | Kizer et al. |

FOREIGN PATENT DOCUMENTS

| | | | |
|---|---|---|---|
| EP | 2636319 | A2 | 9/2013 |
| GB | 1030680 | A | 5/1966 |
| GB | 1059421 | A | 2/1967 |
| GB | 1104993 | A | 3/1968 |
| GB | 2010067 | A | 6/1979 |
| GB | 2030440 | A | 4/1980 |
| GB | 1592952 | A | 7/1981 |
| GB | 2077272 | A | 12/1981 |
| JP | 61210917 | | 3/1988 |
| JP | 199017989 | | 1/1990 |
| JP | 2000342916 | A | 12/2000 |
| JP | 2001187305 | A | 7/2001 |
| JP | 2002512012 | A | 4/2002 |
| JP | 2002257888 | A | 9/2002 |
| JP | 2002355512 | A | 12/2002 |
| JP | 3483331 | B2 | 1/2004 |
| JP | 2007-008158 | A | 1/2007 |
| JP | 2007527698 | A | 10/2007 |
| JP | 2010035550 | A | 2/2010 |
| WO | 9404968 | A1 | 3/1994 |
| WO | 9639054 | A1 | 12/1996 |
| WO | 9953778 | A2 | 10/1999 |
| WO | 00/18810 | A2 | 4/2000 |
| WO | 03039277 | A1 | 5/2003 |
| WO | 2004110186 | A1 | 12/2004 |
| WO | 2008142420 | A1 | 11/2008 |
| WO | 2009112591 | A2 | 9/2009 |
| WO | 2011034947 | A2 | 3/2011 |
| WO | 2011121358 | A1 | 10/2011 |
| WO | 2011140053 | A1 | 11/2011 |
| WO | 2012006478 | A2 | 1/2012 |
| WO | 2012047346 | A1 | 4/2012 |
| WO | 2012047347 | A1 | 4/2012 |
| WO | 2012047348 | A1 | 4/2012 |
| WO | 2012047349 | A1 | 4/2012 |
| WO | 2012051548 | A2 | 4/2012 |
| WO | 2012054111 | A1 | 4/2012 |
| WO | 2014022544 | A1 | 2/2014 |
| WO | 2014059101 | A1 | 4/2014 |

OTHER PUBLICATIONS

Official Action for Singapore Patent Application No. 2013026364 dated Apr. 3, 2014.
UHMW (Ultra High Molecular Weight Polyethylene), Product Information Sheet, Poly-Tech Industrial, Inc. 2011, Retrieved from the internet, [retrieved on Jul. 2, 2014], http://www.polytechindustrial.com/products/plastic-stock-shapes/uhmw-polyethylene.
Official Action for Korean Patent Application No. 10-2013-7012260 dated Jan. 29, 2014.
Official Action for Chinese Application No. 201280003756.0 dated Feb. 11, 2014.
International Search Report and Written Opinion for PCT/US2013/064269 dated Jan. 16, 2014.
Official Action for Canadian Patent Application No. 2,814,074 dated Feb. 6, 2014.
Official Action for JP Patent Application No. 2013-534041 dated Oct. 15, 2013.
Barrera et al., "Melt Flow Index on High Molecular Weight Polyethylene: A Comparative Study of Experiments and Simulation," Journal of Materials Processing Technology, 174 (2006), 171-177.
Official Action for Canadian Patent Application 2813575 dated Oct. 2013.
Official Action for Chinese Patent Application 201180054836.4 dated Jan. 2014.

(56) References Cited

OTHER PUBLICATIONS

Official Action for Chinese Patent Application 201280003756.0 dated Feb. 2014.
Official Action for European Patent Application EP 13168042 dated Jan. 2014.
International Search Report and Written Opinion for PCT/US2011/034947 dated Jul. 22, 2011.
International Search Report and Written Opinion for PCT/US2011/043264 dated Nov. 21, 2011.
International Search Report and Written Opinion for PCT/US2011/043268 dated Dec. 8, 2011.
International Search Report and Written Opinion for PCT/US2011/043269 dated Nov. 21, 2011.
International Search Report and Written Opinion for PCT/US2011/043271 dated Jan. 18, 2012.
International Search Report and Written Opinion for PCST/US2011/044142 dated Dec. 6, 2011.
International Search Report and Written Opinion for PCT/US2011/056388 dated May 24, 2012.
International Search Report and Written Opinion for PCT/US2011/020013 dated Mar. 10, 2011.
International Search Report and Written Opinion for PCT/US2013/052993 dated Nov. 4, 2013.
Official Action for Korean Patent Application KR 10-2013-7011521 dated Mar. 2014.
Official Action for Korean Patent Application KR 10-2013-7012260 dated Jan. 2014.
POLYOX™, Physico-Mechanical Characterization of POLYOX™ for Tablet Manufacture, Colorcon, 2009.
Columbia Activated Carbon, Supplement to Catalog Section S-6450, Data Sheet No. 12, Union Carbide, 1962.
Oficial Action for Chinese Application No. 201280003756.0 dated Sep. 19, 2014.
Official Action for Canadian Application No. 2,814,074 dated Sep. 25, 2014.
Official Action for Chinese Application No. 201310273059.3 dated Dec. 10, 2014.
Official Action for JP Patent Application No. 2013-532798 dated Jan. 20, 2015.
Official Action for Japanese Patent Application No. 2013-534041 dated Sep. 24, 2014.
BAT Bondex Sbtb55a99—Bondex Filter Rods Using Polythene Plus Trisodium Orthophosphate 12H20 as a Bonding Agent, Confidential File Note No. 0709, 1966.
Summary of American Filtrona and B & W Bonded Charcoal Filter Patents Covering Products, Apparatus and Methods, not dated.
Announcing New Tempo Filter Cigarettes . . . First With the New Bonded Charcoal Filter, Ad No. 138-101A, 1964.
Memo dated Jun. 28, 1965 from J.E. Wickham to Mr. F.E. Resnik re: Polyethylene in Tempo and Sano Filters.
Table I, New or Modified Cigarettes in 1964.
Memo from V.C. Johnson to Mr. F.E. Resnik dated Mar. 29, 1965 re: Sano and Tempo Bonded Carbon Filters.
C.I. Report No. 2-65 dated Feb. 28, 1965.
Memo from V.C. Johnson to Mr. J.S. Osmalov (6) dated Nov. 24, 1964 re.: P.M. Bonded Carbon Cigarette Filters vs. Tempo Bonded Carbon Filter Rods.
Official Action for JP Patent Application No. 2013-542267 dated Jul. 8, 2014.
Official Action for Canadian Patent Application 2,812,104 dated Aug. 13, 2014.
UHMW (Ultra High Molecular Weight Polyethylene), Product Information Sheet, Poly-Tech Industrial, Inc. 2011, [online], Retrieved from the Internet, [retrieved on Jul. 2, 2014], URL: http://www.polytechindustrial.com/products/plastic-stock-shapes/uhmw-polyethylene.
Reynolds, R.J., Theory of Cigarette Smoke Filtration, report. Legacy Tobacco Documents Library, University of CA, San Francisco, 1995, [online], retrieved from the internet, http://legacy.library.ucsf.edu/tid/pmc01d00/pdf, retrieved Jan. 30, 2015.
Official Action for European Patent Application No. 12846228.0 dated May 19, 2015.

\* cited by examiner

APPARATUSES, SYSTEMS, AND ASSOCIATED METHODS FOR FORMING POROUS MASSES FOR SMOKE FILTER

CROSS REFERENCE TO RELATED APPLICATION

The present application claims priority to U.S. Provisional Patent Application Ser. No. 61/393,378 filed on Oct. 15, 2010.

BACKGROUND

The present invention relates to apparatuses, systems, and associated methods for producing porous masses that may be used for smoke filters.

The World Health Organization (WHO) has set forth recommendations for the reduction of certain components of tobacco smoke. See: WHO Technical Report Series No. 951, *The Scientific Basis of Tobacco Product Regulation*, World Health Organization (2008). Therein, the WHO recommends that certain components, such as acetaldehyde, acrolein, benzene, benzoapyrene, 1,3-butadiene, and formaldehyde, among others, be reduced to a level below 125% of the median values of the data set. Ibid., Table 3.10, page 112. In view of new international recommendations related to tobacco product regulation, there is a need for new tobacco smoke filters and materials used to make tobacco smoke filters that are able to meet these regulations.

The draw resistance of other smoking articles, e.g., cigarettes, is a major determinant of the draw characteristic(s) of the cigarette which are experienced by a smoker. One measure of draw characteristics is the encapsulated pressure drop. As used herein, the term "encapsulated pressure drop" or "EPD" refers to the static pressure difference between the two ends of a specimen when it is traversed by an air flow under steady conditions when the volumetric flow is 17.5 ml/sec at the output end and when the specimen is completely encapsulated in a measuring device so that no air can pass through the wrapping. EPD has been measured herein under the CORESTA ("Cooperation Centre for Scientific Research Relative to Tobacco") Recommended Method No. 41, dated June 2007. Higher EPD values translate to the smoker having to draw on a smoking device with greater force.

Increasingly, governmental regulations require higher filtration efficacies in removing harmful components from tobacco smoke. By way of nonlimiting example, the World Health Organization recommends that certain components, such as acetaldehyde, acrolein, benzene, benzoapyrene, 1,3-butadiene, and formaldehyde, among others, be reduced to a level below 125% of the median values of the data set.

With present cellulose acetate, higher filtration efficacies can be achieved by doping with increasing concentrations of particles like activated carbon. However, increasing particulate concentration increases the EPD thereby yielding different draw characteristics for smokers. Therefore, technologies with higher filtration efficacies with minimal effect on EPD would be of value.

SUMMARY OF THE INVENTION

The present invention relates to apparatuses, systems, and associated methods for producing porous masses that may be used for smoke filters.

In some embodiments, the present invention provides a system comprising: a material path; a mold cavity disposed along the material path; at least one hopper operably connected to the material path before at least a portion of the mold cavity and capable of feeding a matrix material to the material path; a heat source in thermal communication with at least a first portion of the material path; and a cutter disposed along the material path after the first portion of the material path.

In some embodiments, the present invention provides a method comprising: continuously introducing a matrix material into a mold cavity; disposing a release wrapper as a liner of the mold cavity; heating at least a portion of the matrix material so as to bind the matrix material at a plurality of contact points thereby forming a porous mass length; and cutting the porous mass length radially thereby yielding a porous mass.

In some embodiments, the present invention provides a method comprising: continuously introducing a matrix material into a mold cavity; heating at least a portion of the matrix material so as to bind the matrix material at a plurality of contact points thereby forming a porous mass length; and extruding the porous mass length through a die.

In some embodiments, the present invention provides a system comprising: a mold cavity comprising at least two mold cavity parts, the mold cavity having a longitudinal axis; a first conveyer comprising a first mold cavity part; a second conveyer comprising a second mold cavity part, wherein the first conveyer and second conveyer are operably capable of bringing together the first mold cavity part and the second mold cavity part to form the mold cavity and separating the first mold cavity part from the second mold cavity part in a continuous fashion; a hopper capable of at least partially filling the mold cavity with a matrix material; and a heat source in thermal communication with at least a first portion of the mold cavity so as to transform the matrix material into a porous mass.

In some embodiments, the present invention provides a method comprising: introducing a matrix material into a plurality of mold cavities; and heating the matrix material in the mold cavities so as to bind the matrix material at a plurality of contact points thereby forming a porous mass.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

Figure 1:
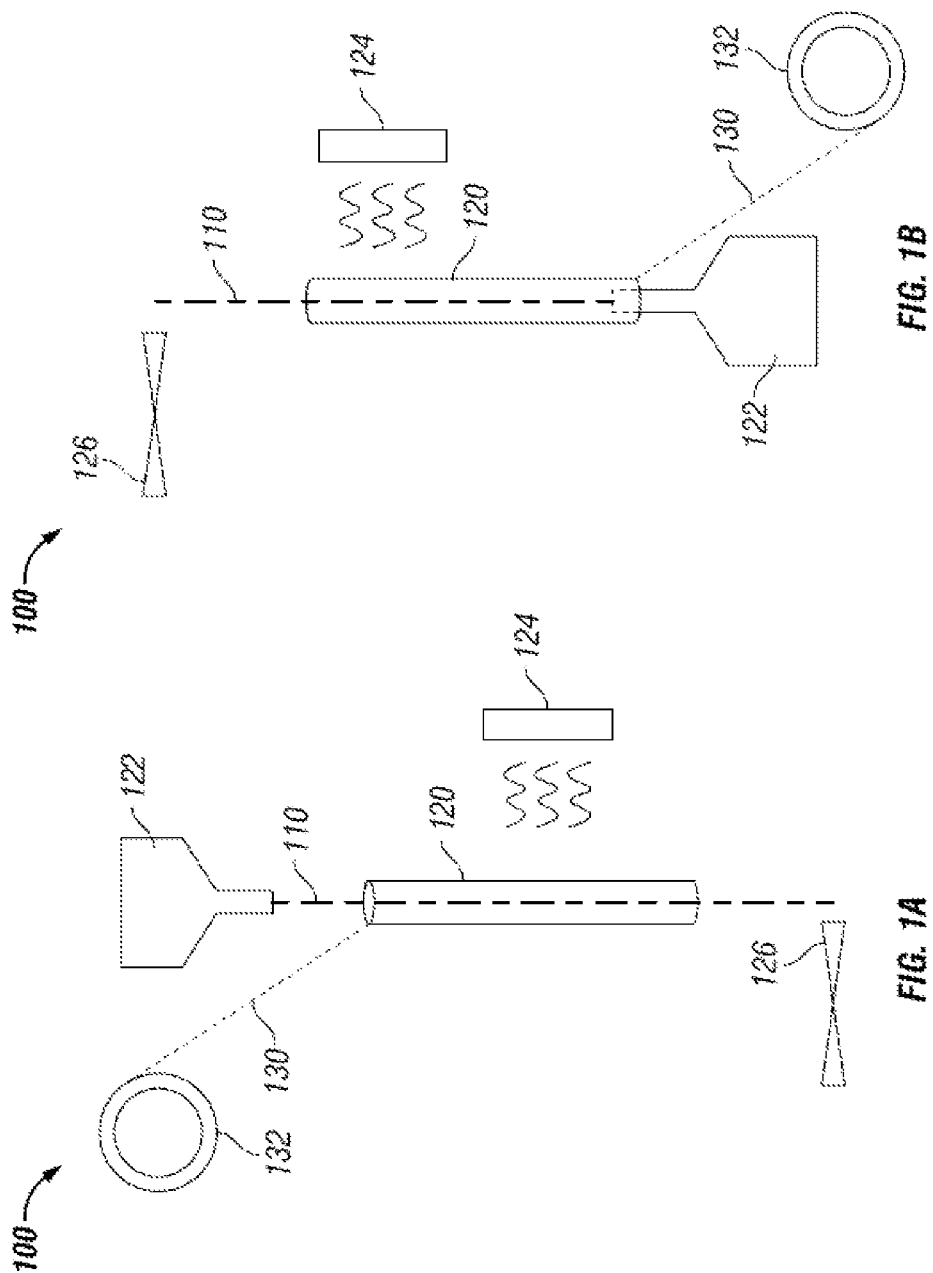
FIGS. 1A-B illustrate nonlimiting examples of systems for forming porous masses according to the present invention (not necessarily to scale).
Figure 2:
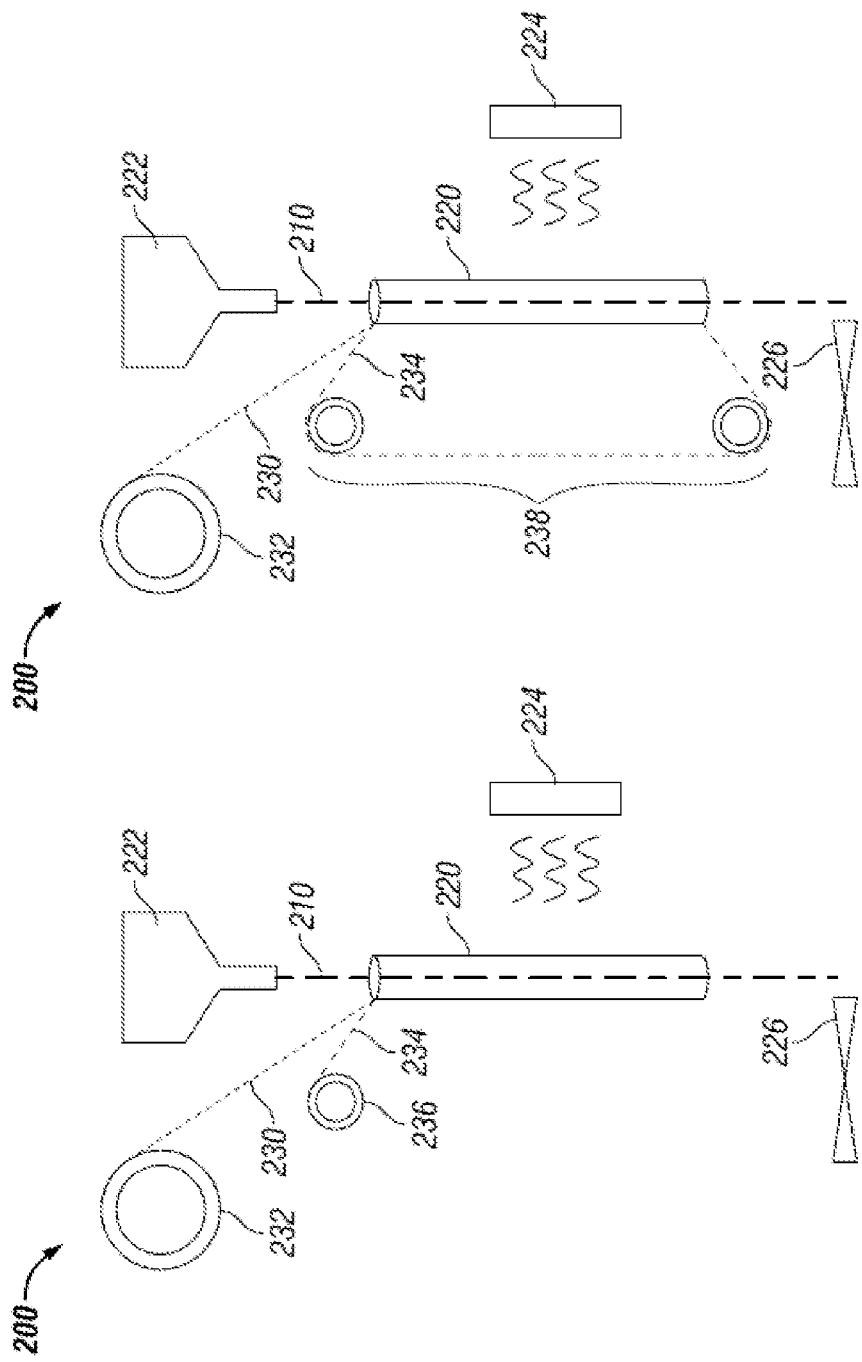
FIGS. 2A-B illustrate nonlimiting examples of systems for forming porous masses according to the present invention (not necessarily to scale).

The present invention relates to apparatuses, systems, and associated methods for producing porous masses that may be used for smoke filters.

The present invention provides methods and apparatuses (and/or systems) for producing porous masses that can be used in smoking device filters with increased filtration efficacy of smoke stream components and with acceptable draw characteristics. Further, the methods and apparatuses provided herein for producing porous masses provide continuous and batch processing capabilities. The porous masses produced have diameters similar to that of current smoking device filters, and therefore, may allow for straightforward integration with present smoking device filter production apparatuses, methods, and products. As used herein, the term "smoking device" refers to articles or devices including, but not limited to, cigarettes, cigarette holders, cigars, cigar holders, pipes, water pipes, hookahs, electronic smoking devices, roll-your-own cigarettes, and/or cigars.

Generally porous masses may comprise a plurality of binder particles and a plurality of active particles mechanically bound at a plurality of contact points. Said contact points may be active particle-binder contact points, binder-binder contact points, and/or active particle-active particle contact points. As used herein, the terms "mechanical bond," "mechanically bonded," "physical bond," and the like refer to a physical connection that holds two particles together. Mechanical bonds may be rigid or flexible depending on the bonding material. Mechanical bonding may or may not involve chemical bonding. It should be understood that as used herein, the terms "particle" and "particulate" may be used interchangeably and include all known shapes of materials, including spherical and/or ovular, substantially spherical and/or ovular, discus and/or platelet, flake, ligamental, acicular, fibrous, polygonal (such as cubic), randomly shaped (such as the shape of crushed rocks), faceted (such as the shape of crystals), or any hybrid thereof. Nonlimiting examples of porous masses are described in detail in co-pending applications PCT/US2011/043264, PCT/US2011/043268, PCT/US2011/043269, and PCT/US2011/043270, the entire disclosures of which are included herein by reference.

The process of forming porous masses may include continuous processing methods, batch processing methods, or hybrid continuous-batch processing methods. As used herein, "continuous processing" refers to manufacturing or producing materials without interruption. Material flow may be continuous, indexed, or combinations of both. As used herein, "batch processing" refers to manufacturing or producing materials as a single component or group of components at individual stations before the single component or group proceeds to the next station. As used herein, "continuous-batch processing" refers to a hybrid of the two where some processes, or series of processes, occur continuously and others occur by batch.

Generally porous masses may be formed from matrix materials. As used herein, the term "matrix material" refers to the precursors, e.g., binder particles and active particles, used to form porous masses. In some embodiments, the matrix material may comprise, consist of, or consist essentially of binder particles and active particles. In some embodiments, the matrix material may comprise binder particles, active particles, and additives. Nonlimiting examples of suitable binder particles, active particles, and additives are provided later in this disclosure.

Forming porous masses may generally include forming a matrix material into a shape and mechanically bonding at least a portion of the matrix material at a plurality of contact points.

Forming a matrix material into a shape may involve a mold cavity. In some embodiments, a mold cavity may be a single piece or a collection of single pieces, either with or without end caps, plates, or plugs. In some embodiments, a mold cavity may be multiple mold cavity parts that when assembled form a mold cavity. In some embodiments, mold cavity parts may be brought together with the assistance of conveyors, belts, and the like.

A mold cavity may have any cross-sectional shape including, but not limited to, circular, substantially circular, ovular, substantially ovular, polygonal (like triangular, square, rectangular, pentagonal, and so on), polygonal with rounded edges, and the like, or any hybrid thereof. In some embodiments, porous masses may have a cross-sectional shape comprising holes, which may be achieved by machining, or any other suitable method (e.g., degradation of a degradable material). In some embodiments, the porous mass may have a specific shape for a cigarette holder or pipe that is adapted to fit within the cigarette holder or pipe to allow for smoke passage through the filter to the consumer. When discussing the shape of a porous mass herein, with respect to a traditional smoking device filter, the shape may be referred to in terms of diameter or circumference (wherein the circumference is the perimeter of a circle) of the cross-section of the cylinder. But in embodiments where a porous mass of the present invention is in a shape other than a true cylinder, it should be understood that the term "circumference" is used to mean the perimeter of any shaped cross-section, including a circular cross-section.

Generally, mold cavities may have a longitudinal direction and a radial direction perpendicular to the longitudinal direction, e.g., a cylindrical shape. One skilled in the art should understand how to translate the embodiments presented herein to mold cavities without defined longitudinal and radial direction, e.g., spheres and cubes, where applicable. In some embodiments, a mold cavity may have a cross-sectional shape that changes along the longitudinal direction, e.g., a conical shape, a shape that transitions from square to circular, or a spiral.

In some embodiments, mold cavities may have a longitudinal axis having an opening as a first end and a second end along said longitudinal axis. In some embodiments, matrix material may pass along the longitudinal axis of a mold cavity during processing. By way of nonlimiting example, FIG. 1 shows mold cavity 120 with a longitudinal axis along material path 110.

In some embodiments, mold cavities may have a longitudinal axis having a first end and a second end along said longitudinal axis wherein at least one end is closed. In some embodiments, said closed end may be capable of opening.

In some embodiments, individual mold cavities may be filled with a matrix material prior to mechanical bonding. In some embodiments, a single mold cavity may be used to continuously produce porous masses by continuously passing matrix material therethrough before and/or during mechanical bonding. In some embodiments, a single mold cavity may be used to produce an individual porous mass. In some embodiments, said single mold cavity may be reused and/or continuously reused to produce a plurality of individual porous masses.

In some embodiments, mold cavities may be at least partially lined with wrappers and/or coated with release agents. In some embodiments, wrappers may be individual wrappers, e.g., pieces of paper. In some embodiments, wrappers may be spoolable-length wrappers, e.g., a 50 ft roll of paper.

In some embodiments, mold cavities may be lined with more than one wrapper. In some embodiments, forming porous masses may include lining a mold cavity(s) with a wrapper(s). In some embodiments, forming porous masses may include wrapping the matrix material with wrappers so that the wrapper becomes the mold cavity. In such embodiments, the wrapper may be preformed as a mold cavity, formed as a mold cavity in the presence of the matrix material, or wrapped around matrix material that is in a preformed shape (e.g., with the aid of a tackifier). In some embodiments, wrappers may be continuously fed through a mold cavity. Wrappers may be capable of holding the porous mass in a shape, capable of releasing the porous masses from the mold cavities, capable of assisting in passing matrix material through the mold cavity, capable of protecting the porous mass during handling or shipment, or any combination thereof.

Suitable wrappers may include, but not be limited to, papers (e.g., wood-based papers, papers containing flax, flax papers, papers produced from other natural or synthetic fibers, functionalized papers, special marking papers, colorized papers), plastics (e.g., fluorinated polymers like polytetrafluoroethylene, silicone), films, coated papers, coated plastics, coated films, and the like, or any combination thereof. In some embodiments, wrappers may be papers suitable for use in smoking device filters.

In some embodiments, a wrapper may be adhered (e.g., glued) to itself to assist in maintaining a desired shape. In some embodiments, mechanical bonding of the matrix material may also mechanically bind the matrix material to the wrapper which may alleviate the need for adhering the wrapper to itself.

Suitable release agents may be chemical release agents or physical release agents. Nonlimiting examples of chemical release agents may include oils, oil-based solutions and/or suspensions, soapy solutions and/or suspensions, coatings bonded to the mold surface, and the like, or any combination thereof. Nonlimiting examples of physical release agents may include papers, plastics, or any combination thereof. Physical release agents, which may be referred to as release wrappers, may be implemented similar to wrappers as described herein.

Once formed into a desired cross-sectional shape with the mold cavity, the matrix material may be mechanically bound at a plurality of contact points. Mechanical bonding may occur during and/or after the matrix material is in the mold cavity. Mechanical bonding may be achieved with heat and/or pressure.

Heat may be radiant heat, conductive heat, convective heat, or any combination thereof. Heating may involve thermal sources including, but not limited to, heated fluids internal to the mold cavity, heated fluids external to the mold cavity, steam, heated inert gases, secondary radiation from nanoparticles, ovens, furnaces, flames, thermoelectric materials, ultrasonics, and the like, or any combination thereof. By way of nonlimiting example, heating may involve a convection oven. Another nonlimiting example may involve passing heated air, nitrogen, or other gas through the matrix material while in the mold cavity. In some embodiments, heated inert gases may be used to mitigate any unwanted oxidation of active particles and/or additives. Another nonlimiting example may involve mold cavities made of thermoelectric materials so that the mold cavity heats. Secondary radiation from nanoparticles may be achieved by irradiating nanoparticles with electromagnetic radiation, e.g., gamma-rays, x-rays, UV light, visible light, IR light, microwaves, radio waves, and/or long radio waves. By way of nonlimiting example, matrix material may comprise carbon nanotubes that when irradiated with radio frequency waves emit heat. One skilled in the art, with the benefit of this disclosure, should understand that different wavelengths of electromagnetic radiation penetrate materials to different depths. Therefore, when employing nanoparticles for production of secondary radiation one should consider the mold cavity configuration and composition, the matrix material composition, the nanoparticle, the wavelength of electromagnetic radiation, the intensity of the electromagnetic radiation, the irradiation methods, and the desired amount of secondary radiation, e.g., heat.

It should be noted that when "about" is provided below in reference to a number in a numerical list, the term "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, heating to facilitate mechanical bonding may be to a softening temperature of a component of the matrix material. As used herein, the term "softening temperature" refers to the temperature above which a material becomes pliable, which is typically below the melting point of the material.

In some embodiments, mechanical bonding may be achieved at temperatures ranging from a lower limit of about 90° C., 100° C., 110° C., 120° C., 130° C., or 140° C. or an upper limit of about 300° C., 275° C., 250° C., 225° C., 200° C., 175° C., or 150° C., and wherein the temperature may range from any lower limit to any upper limit and encompass any subset therebetween. In some embodiments, the heating may be accomplished by subjecting material to a single temperature. In another embodiment the temperature profile may vary with time. By way of nonlimiting example, a convection oven may be used. In some embodiments, heating may be localized within the matrix material. By way of nonlimiting example, secondary radiation from nanoparticles may heat only the matrix material proximal to the nanoparticle.

In some embodiments, matrix materials may be preheated before entering mold cavities. In some embodiments, matrix material may be preheated to a temperature below the softening temperature of a component of the matrix material. In some embodiments, matrix material may be preheated to a temperature about 10%, about 5%, or about 1% below the softening temperature of a component of the matrix material. In some embodiments, matrix material may be preheated to a temperature about 10° C., about 5° C., or about 1° C. below the softening temperature of a component of the matrix material. Preheating may involve heat sources including, but not limited to, those listed as heat sources above for achieving mechanical bonding.

In some embodiments, bonding the matrix material may yield porous mass or porous mass lengths. As used herein, the term "porous mass lengths" refers to a continuous porous mass. By way of nonlimiting example, porous mass lengths may be produced by continuously passing matrix material through a heated mold cavity. In some embodiments, the binder particles may retain their original physical shape (or substantially retained their original shape, e.g., no more that 10% variation (e.g., shrinkage) in shape from original) during the mechanical bonding process, i.e., the binder particles may be substantially the same shape in the matrix material and in the porous mass (or lengths).

In some embodiments, porous mass lengths may be cut to yield porous mass. Cutting may be achieved with a cutter. Suitable cutters may include, but not be limited to, blades, hot blades, carbide blades, stellite blades, ceramic blades, hardened steel blades, diamond blades, smooth blades, serrated blades, lasers, pressurized fluids, liquid lances, gas lances, guillotines, and the like, or any combination thereof. In some embodiments with high-speed processing, cutting blades or similar devices may be positioned at an angle to match the speed of processing so as to yield porous masses with ends perpendicular to the longitudinal axis. In some embodiments, the cutter may change position relative to the porous mass lengths along the longitudinal axis of the porous mass lengths.

In some embodiments, porous masses and/or porous mass lengths may be extruded. In some embodiments, extrusion may involve a die. In some embodiments, a die may have multiple holes being capable of extruding porous masses and/or porous mass lengths.

Some embodiments may involve cutting porous masses and/or porous mass lengths radially to yield porous mass sections. Cutting may be achieved by any known method with any known apparatus including, but not limited to, those described above in relation to cutting porous mass lengths into porous masses.

The length of a porous mass, or sections thereof, may range from a lower limit of about 2 mm, 3 mm, 5 mm, 10 mm, 15 mm, 20 mm, 25 mm, or 30 mm to an upper limit of about 150 mm, 100 mm, 50 mm, 25 mm, 15 mm, or 10 mm, and wherein the length may range from any lower limit to any upper limit and encompass any subset therebetween.

The circumference of a porous mass length, a porous mass, or sections thereof (wrapped or otherwise) may range from a lower limit of about 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, or 26 mm to an upper limit of about 60 mm, 50 mm, 40 mm, 30 mm, 20 mm, 29 mm, 28 mm, 27 mm, 26 mm, 25 mm, 24 mm, 23 mm, 22 mm, 21 mm, 20 mm, 19 mm, 18 mm, 17 mm, or 16 mm, wherein the circumference may range from any lower limit to any upper limit and encompass any subset therebetween.

Some embodiments may involve wrapping porous mass sections, porous masses, and/or porous mass lengths with a wrapper. Suitable wrappers include those disclosed above.

Some embodiments may involve cooling porous mass sections, porous masses, and/or porous mass lengths (wrapped or otherwise). Cooling may be active or passive, i.e., cooling may be assisted or occur naturally. Active cooling may involve passing a fluid over and/or through the mold cavity, porous mass sections, porous masses, and/or porous mass lengths (wrapped or otherwise); decreasing the temperature of the local environment about the mold cavity, porous mass sections, porous masses, and/or porous mass lengths (wrapped or otherwise), e.g., passing through a refrigerated component; or any combination thereof. Active cooling may involve a component that may include, but not be limited to, cooling coils, fluid jets, thermoelectric materials, or any combination thereof. The rate of cooling may be random or it may be controlled.

Some embodiments may involve transporting porous mass sections, porous masses, and/or porous mass lengths (wrapped or otherwise) to another location. Suitable forms of transportation may include, but not be limited to, conveying, carrying, rolling, pushing, shipping, and the like, or any combination thereof.

One skilled in the art, with the benefit of this disclosure, should understand the plurality of apparatuses and/or systems capable of producing porous mass sections, porous masses, and/or porous mass lengths. By way of nonlimiting examples, FIGS. 1-11 illustrate a plurality of apparatuses and/or systems capable of producing porous mass sections, porous masses, and/or porous mass lengths.

It should be noted that where a system is used, it is within the scope of this disclosure to have an apparatus with the components of a system, and vice versa.

For ease of understanding, the term "material path" is used herein to identify the path along which matrix material, porous mass lengths, and/or porous masses will travel in a system and/or apparatus. In some embodiments, a material path may be contiguous. In some embodiments, a material path may be noncontiguous. By way of nonlimiting example, systems for batch processing with multiple, independent mold cavities may be considered to have a noncontiguous material path.

Referring now to FIGS. 1A-B, system 100 may include hopper 122 operably connected to material path 110 to feed the matrix material (not shown) to material path 110. System 100 may also include paper feeder 132 operably connected to material path 110 so as to feed paper 130 into material path 110 to form a wrapper substantially surrounding the matrix material between mold cavity 120 and the matrix material. Heating element 124 is in thermal communication with the matrix material while in mold cavity 120. Heating element 124 may cause the matrix material to mechanically bond at a plurality of points thereby yielding a wrapped porous mass length (not shown). After the wrapped porous mass length exits mold cavity 120 and is suitably cooled, cutter 126 cuts the wrapped porous mass length radially, i.e., perpendicular to the longitudinal axis, thereby yielding wrapped porous masses and/or wrapped porous mass sections.

FIGS. 1A-B, demonstrate that system 100 may be at any angle. One skilled in the art, with the benefit of this disclosure, should understand the configurational considerations when adjusting the angle at which system 100, or any component thereof, is placed. By way of nonlimiting example, FIG. 1B shows hopper 122 may be configured such that the outlet of hopper 122 (and any corresponding matrix feed device) is within mold cavity 120. In some embodiments, a mold cavity may be at an angle at or between vertical and horizontal.

In some embodiments, feeding matrix material to a material path may involve any suitable feeder system including, but not limited to, volumetric feeders, mass flow feeders, gravimetric feeders, augers or screws, chutes, slides, conveyors, tubes, conduits, channels, and the like, or any combination thereof. In some embodiments, the material path may include a mechanical component between the hopper and the mold cavity including, but not limited to, garnitures, ram presses, pistons, shakers, extruders, twin screw extruders, solid state extruders, and the like, or any combination thereof. In some embodiments, feeding may involve, but not be limited to, forced feeding, controlled rate feeding, volumetric feeding, mass flow feeding, gravimetric feeding, vacuum-assisted feeding, fluidized powder feeding, or any combination thereof. In some embodiments, feeding may be indexed to enable the insertion of a spacer material at predetermined intervals. Suitable spacer materials may comprise additives, solid barriers (e.g., mold cavity parts), porous barriers (e.g., papers and release wrappers), filters, cavities, and the like, or any combination thereof. In some embodiments, feeding may involve shaking and/or vibrating. One skilled in the art, with the benefit of this disclosure, should understand the degree of shaking and/or vibrating that is appropriate, e.g., a homogenously distributed matrix material comprising large binder particles and small active particles may be adversely effected by vibrating, i.e., homogeneity may be at least partially lost. Further, one skilled in the art should understand the effects of feeding parameters and/or feeders on the final properties of the porous masses produced, e.g., the effects on at least void volume (discussed further below), encapsulated pressure drop (discussed further below), and compositional homogeneity.

Referring now to FIGS. 2A-B, system 200 may include hopper 222 operably connected to material path 210 to feed the matrix material to material path 210. System 200 may also include paper feeder 232 operably connected to material path 210 so as to feed paper 230 into material path 210 to form a wrapper substantially surrounding the matrix material between mold cavity 220 and the matrix material. Further, system 200 may include release feeder 236 operably connected to material path 210 so as to feed release wrapper 234 into material path 210 to form a wrapper between paper 230 and mold cavity 220. In some embodiments, release feeder 236 may be configured as conveyor 238 that continuously cycles release wrapper 234. Heating element 224 is in thermal communication with the matrix material while in mold cavity 220. Heating element 224 may cause the matrix material to mechanically bond at a plurality of points thereby yielding a wrapped porous mass length. After the wrapped porous mass length exits mold cavity 220, cutter 226 cuts the wrapped porous mass length radially thereby yielding wrapped porous masses and/or wrapped porous mass sections. In embodiments where release wrapper 234 is not configured as conveyor 238, release wrapper 234 may be removed from the wrapped porous mass length before cutting or from the wrapped porous masses and/or wrapped porous mass sections after cutting.

Figure 3:
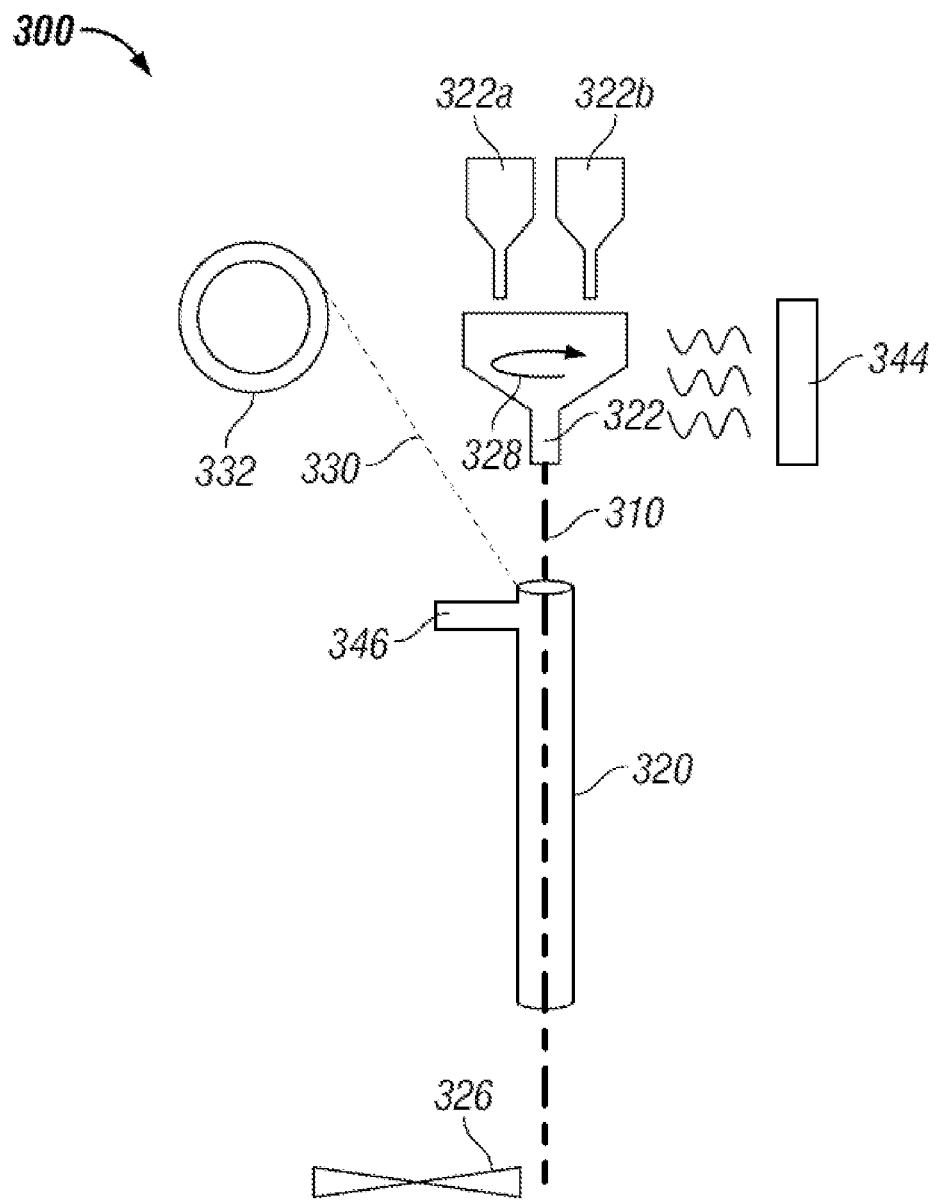
FIG. 3 illustrates a nonlimiting example of a system for forming porous masses according to the present invention (not necessarily to scale).

Referring now to FIG. 3, system 300 may include component hoppers 322a and 322b that feed components of the matrix material into hopper 322. The matrix material may be mixed and preheated in hopper 322 with mixer 328 and preheater 344. Hopper 322 may be operably connected to material path 310 to feed the matrix material to material path 310. System 300 may also include paper feeder 332 operably connected to material path 310 so as to feed paper 330 into material path 310 to form a wrapper substantially surrounding the matrix material between mold cavity 320 and the matrix material. Mold cavity 320 may include fluid connection 346 through which heated fluid (liquid or gas) may pass into material path 310 and mechanically bond the matrix material at a plurality of points thereby yielding a wrapped porous mass length. After the wrapped porous mass length exits mold cavity 320, cutter 326 cuts the wrapped porous mass length radially thereby yielding wrapped porous masses and/or wrapped porous mass sections.

Suitable mixers may include, but not be limited to, ribbon blenders, paddle blenders, plow blenders, double cone blenders, twin shell blenders, planetary blenders, fluidized blenders, high intensity blenders, rotating drums, blending screws, rotary mixers, and the like, or any combination thereof.

In some embodiments, component hoppers may hold individual components of the matrix material, e.g., two component hoppers with one holding binder particles and the other holding active particles. In some embodiments, component hoppers may hold mixtures of components of the matrix material, e.g., two component hoppers with one holding a mixture of binder particles and active particles and the other holding an additive like flavorant. In some embodiments, the components within component hoppers may be solids, liquids, gases, or combinations thereof. In some embodiments, the components of different component hoppers may be added to the hopper at different rates to achieve a desired blend for the matrix material. By way of nonlimiting example, three component hoppers may separately hold active particles, binder particles, and active compounds (an additive described further below) in liquid form. Binder particles may be added to the hopper at twice the rate of the active particles, and the active compounds may be sprayed in so as to form at least a partial coating on both the active particles and the binder particles.

In some embodiments, fluid connections to mold cavities may be to pass a fluid into the mold cavity, pass a fluid through a mold cavity, and/or drawing on a mold cavity. As used herein, the term "drawing" refers to creating a negative pressure drop across a boundary and/or along a path, e.g., sucking. Passing a heated fluid into and/or through a mold cavity may assist in mechanically bonding the matrix material therein. Drawing on a mold cavity that has a wrapper disposed therein may assist in lining the mold cavity evenly, e.g., with less wrinkles.

Figure 4:
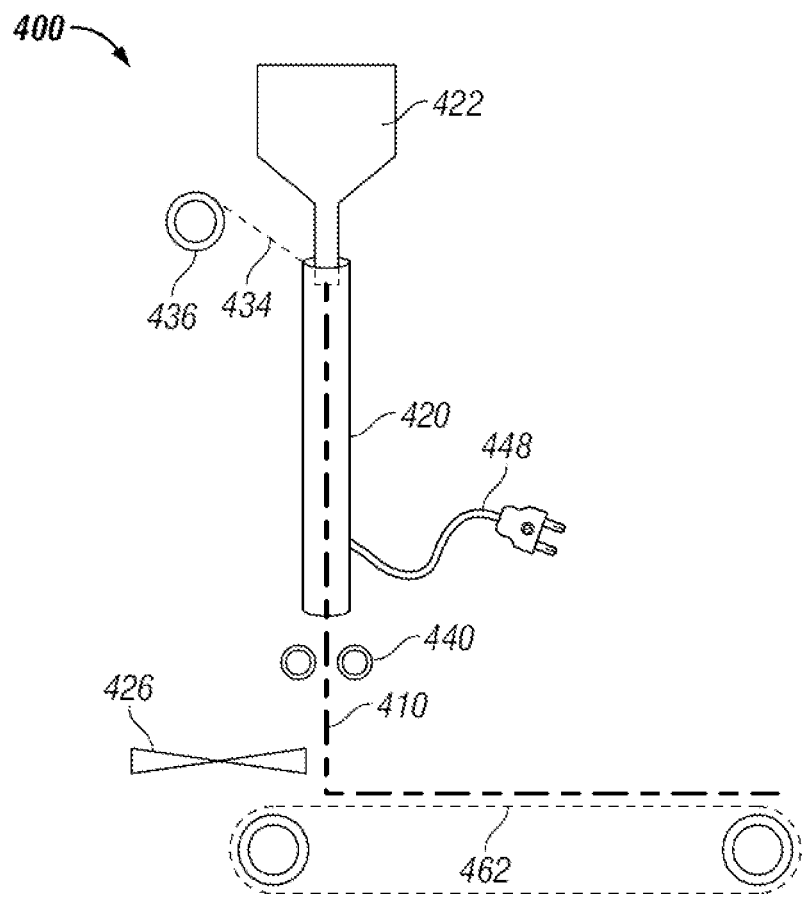
FIG. 4 illustrates a nonlimiting example of a system for forming porous masses according to the present invention (not necessarily to scale).

Referring now to FIG. 4, system 400 may include hopper 422 operably connected to material path 410 to feed the matrix material to material path 410. Hopper 422 may be configured along material path 410 such that the outlet of hopper 422 is within mold cavity 420. This may advantageously allow for the matrix material to be fed into mold cavity 420 at a rate to control the packing of the matrix material and consequently the void volume of resultant porous masses. In this nonlimiting example, mold cavity 420 comprises a thermoelectric material and therefore includes power connection 448. System 400 may also include release feeder 436 operably connected to material path 410 so as to feed release wrapper 434 into material path 410 to form a wrapper substantially surrounding the matrix material between mold cavity 420 and the matrix material. Mold cavity 420 may be made of a thermoelectric material so that mold cavity 420 may provide the heat to mechanically bond the matrix material at a plurality of points thereby yielding a wrapped porous mass length. Along material path 410 after mold cavity 420, roller 440 may be operably capable of assisting the movement of the wrapped porous mass length through mold cavity 420. After the wrapped porous mass length exits mold cavity 420, cutter 426 cuts the wrapped porous mass length radially thereby yielding wrapped porous masses and/or wrapped porous mass sections. After cutting the porous masses continue along material path 410 on porous mass conveyor 462 perhaps for packaging or further processing. Release wrapper 434 may be removed from the wrapped porous mass length before cutting or from the wrapped porous masses and/or wrapped porous mass sections after cutting.

Suitable rollers and/or substitutes for rollers may include, but not be limited to, cogs, cogwheels, wheels, belts, gears, and the like, or any combination thereof. Further rollers and the like may be flat, toothed, beveled, and/or indented.

Figure 5:
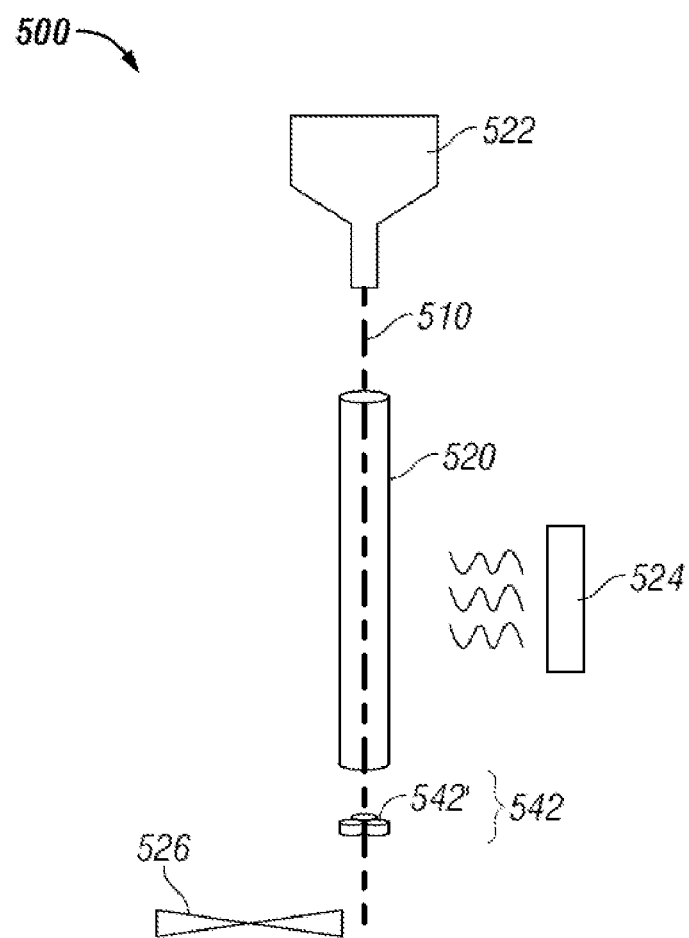
FIG. 5 illustrates a nonlimiting example of a system for forming porous masses according to the present invention (not necessarily to scale).

Referring now to FIG. 5, system 500 may include hopper 522 operably connected to material path 510 to feed the matrix material to material path 510. Heating element 524 is in thermal communication with the matrix material while in mold cavity 520. Heating element 524 may cause the matrix material to mechanically bond at a plurality of points thereby yielding a porous mass length. After the porous mass length exits mold cavity 520, die 542 may be used for extruding the porous mass length into a desired cross-sectional shape. Die 542 may include a plurality of dies 542' through which the porous mass length may be extruded. After the porous mass length is extruded through die 542, cutter 526 cuts the porous mass length radially thereby yielding porous masses and/or porous mass sections.

Figure 6:
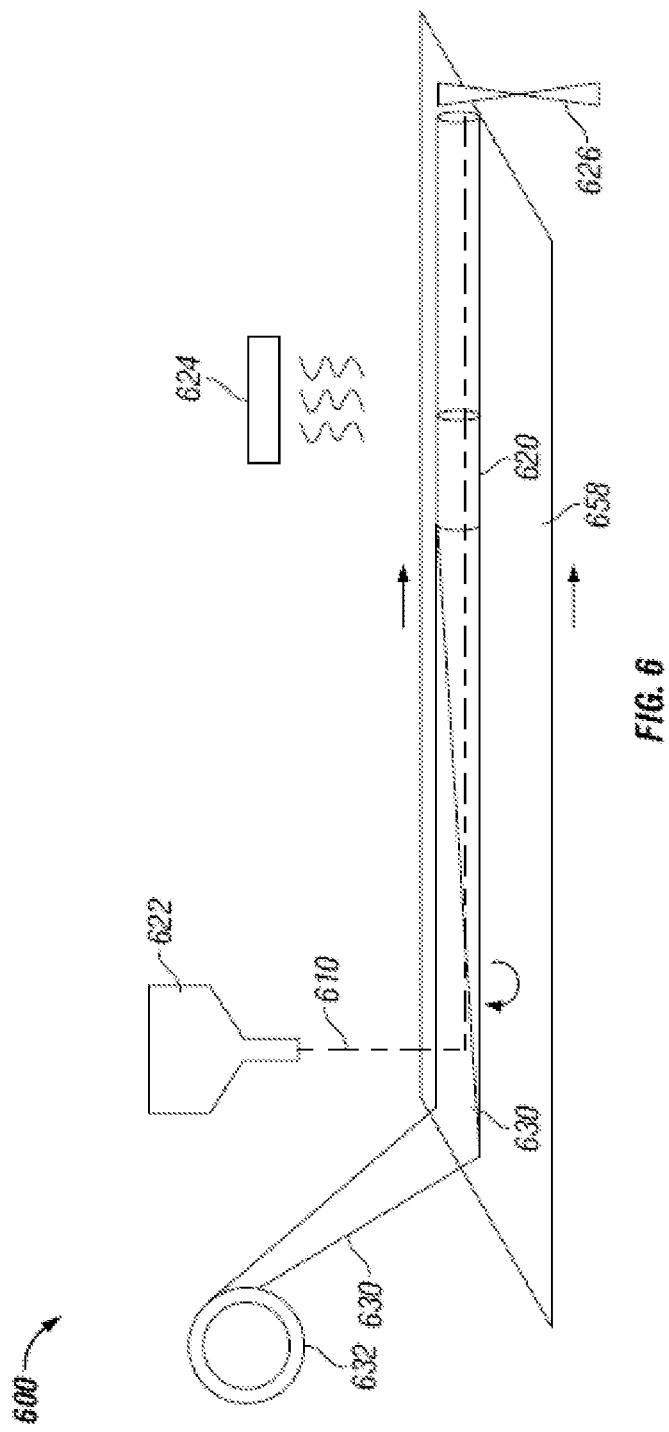
FIG. 6 illustrates a nonlimiting example of a system for forming porous masses according to the present invention (not necessarily to scale).

Referring now to FIG. 6, system 600 may include paper feeder 632 operably connected to material path 610 so as to feed paper 630 into material path 610. Hopper 622 may be operably connected to material path 610 so as to place matrix material on paper 630. Paper 630 may wrap around the matrix material at least in part because of passing through mold cavity 620. Heating element 624 is in thermal communication with the matrix material while and/or after being in mold cavity 620. Heating element 624 may cause the matrix material to mechanically bond at a plurality of points thereby yielding a wrapped porous mass length. After the wrapped porous mass length exits mold cavity 620, cutter 626 cuts the wrapped porous mass length radially thereby yielding wrapped porous masses and/or wrapped porous mass sections. Movement through system 600 may be aided by conveyor 658 with mold cavity 620 being stationary. It should be noted that while not shown, a similar embodiment may include paper 630 as part of a looped conveyor that unwraps from the porous mass length before cutting, which would yield porous masses and/or porous mass sections.

Figure 7:
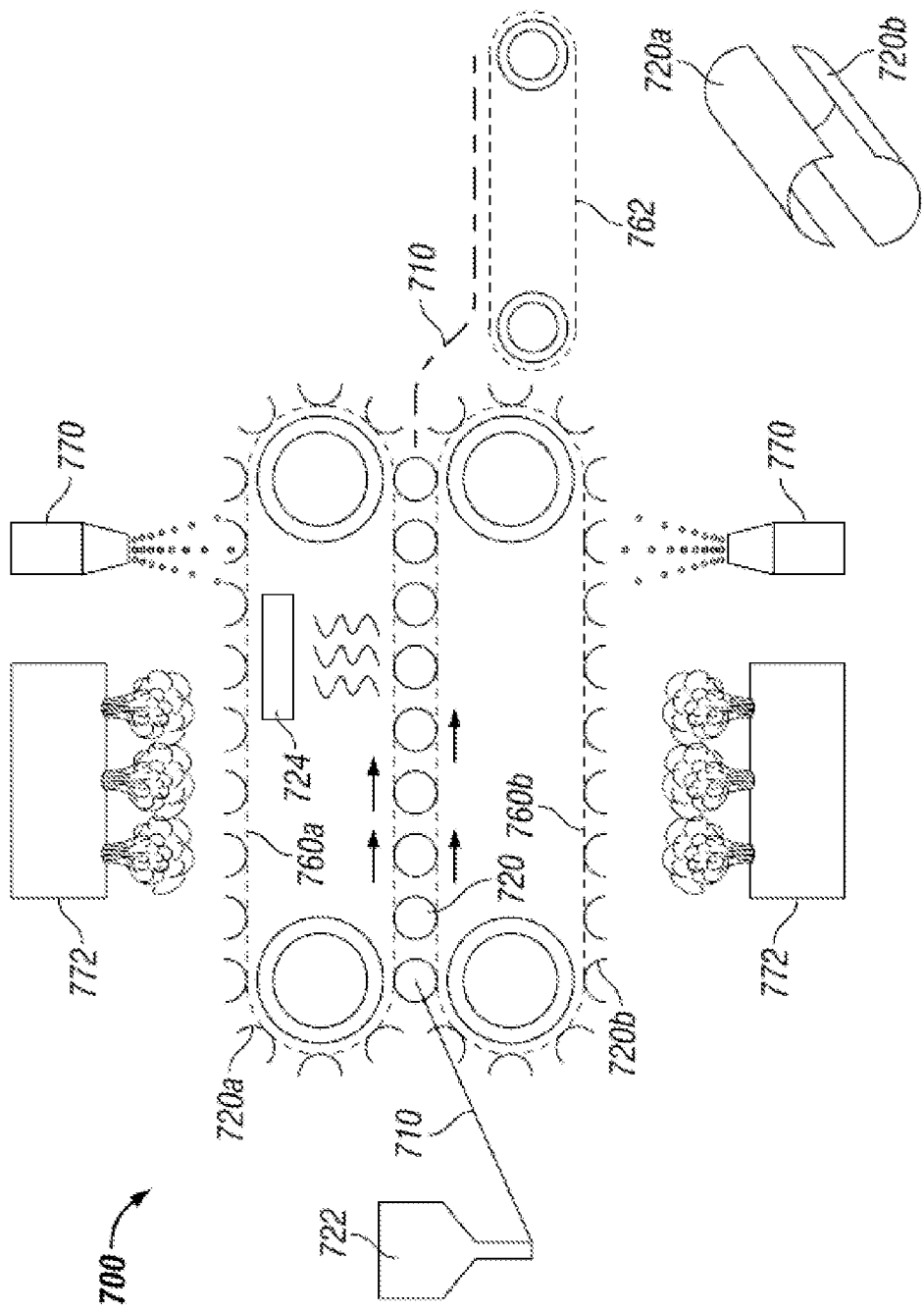
FIG. 7 illustrates a nonlimiting example of a system for forming porous masses according to the present invention (not necessarily to scale).

Referring now to FIG. 7, mold cavity 720 of system 700 may be formed from mold cavity parts 720a and 720b operably connected to mold cavity conveyors 760a and 760b, respectively. Once mold cavity 720 is formed, matrix material may be introduced along material path 710 from hopper 722. Heating element 724 is in thermal communication with the matrix material while in mold cavity 720. Heating element 724 may cause the matrix material to mechanically bond at a plurality of points thereby yielding a porous mass. After mold cavity 720 separates into mold cavity parts 720a and 720b, the porous mass may be removed from mold cavity parts 720a and/or 720b and continue along material path 710 via porous mass conveyor 762. It should be noted that FIG. 7 illustrates a nonlimiting example of a noncontiguous material path.

In some embodiments, removing porous masses from mold cavities and/or mold cavity parts may involve pulling mechanisms, pushing mechanisms, lifting mechanisms, gravity, any hybrid thereof, or any combination thereof. Removing mechanisms may be configured to engage porous masses at the ends, along the side(s), or any combination thereof. Suitable pulling mechanisms may include, but not be limited to, suction cups, vacuum components, tweezers, pincers, forceps, tongs, grippers, claws, clamps, and the like, or any combination thereof. Suitable pushing mechanisms may include, but not be limited to, ejectors, punches, rods, pistons, wedges, spokes, rams, pressurized fluids, and the like, or any combination thereof. Suitable lifting mechanisms may include, but not be limited to, suction cups, vacuum components, tweezers, pincers, forceps, tongs, grippers, claws, clamps, and the like, or any combination thereof. In some embodiments, mold cavities may be configured to operably work with various removal mechanisms. By way of nonlimiting example, a hybrid push-pull mechanism may include pushing longitudinally with a rod so as to move the porous mass partially out the other end of the mold cavity which can then be engaged by forceps to pull the porous mass from the mold cavity.

Figure 8:
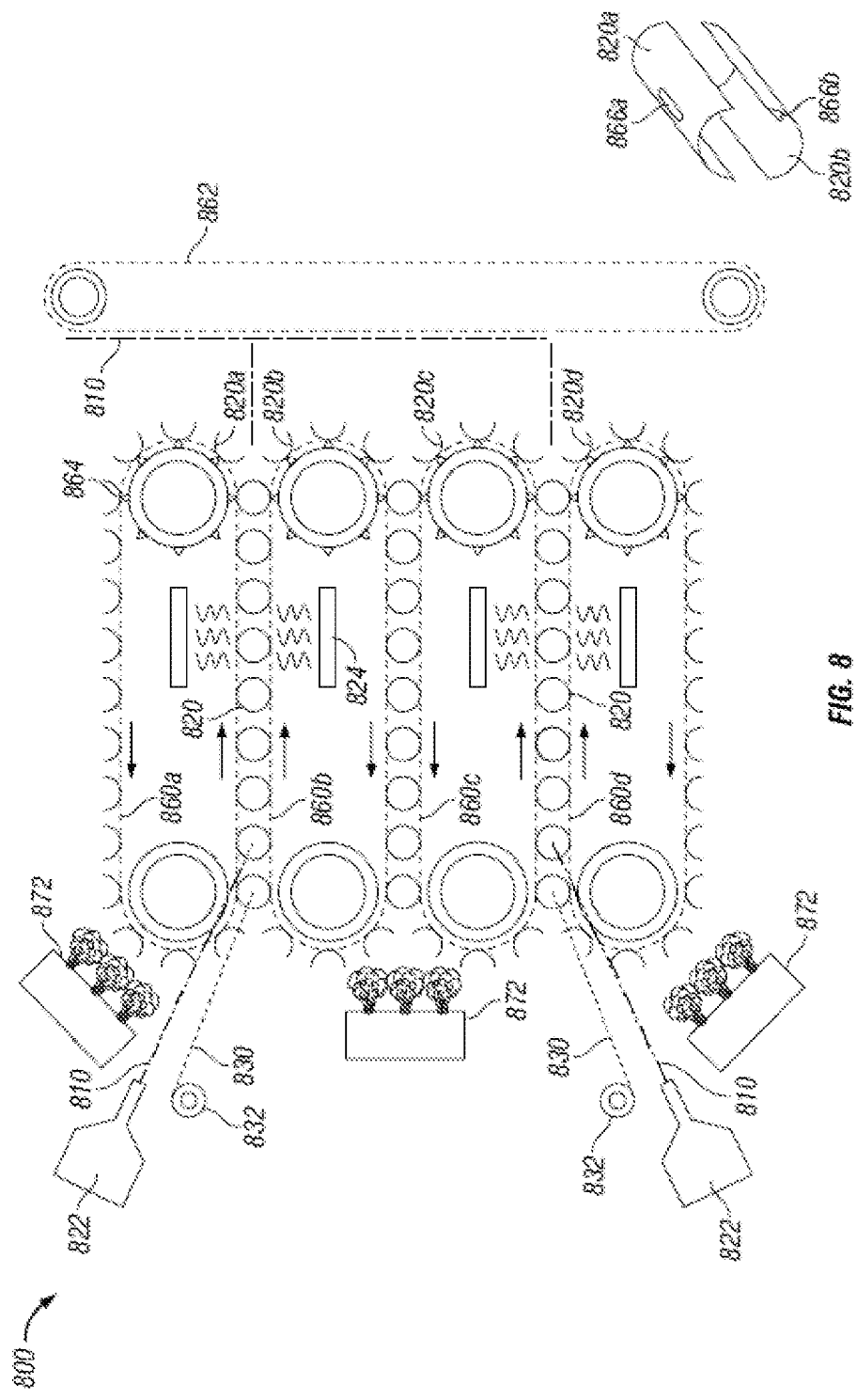
FIG. 8 illustrates a nonlimiting example of a system for forming porous masses according to the present invention (not necessarily to scale).
Figure 9:
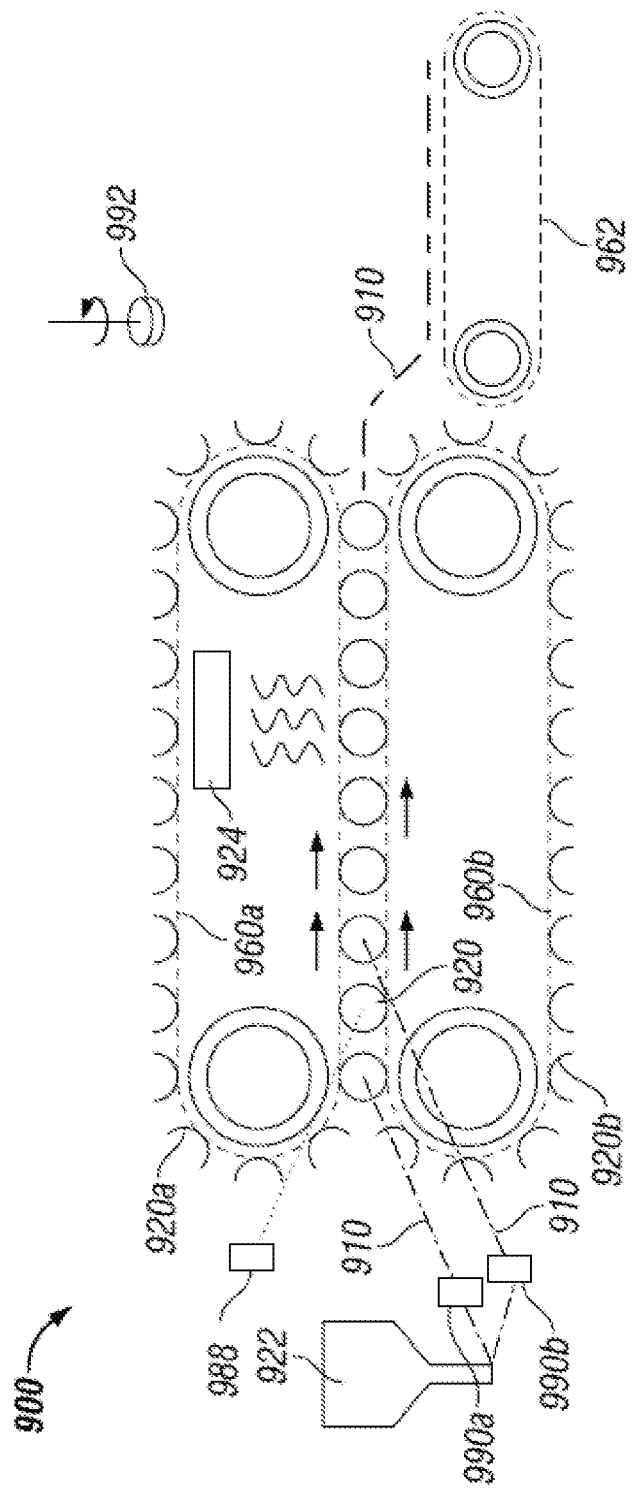
FIG. 9 illustrates a nonlimiting example of a system for forming porous masses according to the present invention (not necessarily to scale).

Referring now to FIG. 8, mold cavity 820 of system 800 is formed from mold cavity parts 820a and 820b or 820c and 820d operably connected to mold cavity conveyors 860a, 860b, 860c, and 860d, respectively. Once mold cavity 820 is formed, or during forming, sheets of paper 830 are introduced into mold cavity 820 via paper feeder 832. Then matrix material is introduced into paper 830 from hopper 822 along material path 810 lined mold cavity 820 and mechanically bound into porous masses with heat from heating element 824. Removal of the porous masses may be achieved by insertion of ejector 864 into ejector ports 866a and 866b of mold cavity parts 820a, 820b, 820c, and 820d. The porous masses may then and continue along material path 810 via porous mass conveyor 862. Again, FIG. 8 illustrates a nonlimiting example of a noncontiguous material path.

Quality control of porous mass production may be assisted with cleaning of mold cavities and/or mold cavity parts. Referring again to FIG. 7, cleaning instruments may be incorporated into system 700. As mold cavity parts 720a and 720b return from forming porous masses, mold cavity parts 720a and 720b pass a series of cleaners including liquid jet 770 and air jet 772. Similarly in FIG. 8, as mold cavity parts 860a, 860b, 860c, and 860d return from forming porous masses, mold cavity parts 860a, 860b, 860c, and 860d pass a series of cleaners including heat from heating element 824 and air jet 872.

Other suitable cleaners may include, but not be limited to, scrubbers, brushes, baths, showers, insert fluid jets (tubes that insert into mold cavities capable of jetting fluids radially), ultrasonic apparatuses, or any combination thereof.

In some embodiments, porous mass sections, porous masses, and/or porous mass lengths may comprise cavities. By way of nonlimiting example, referring now to FIG. 9, mold cavity parts 920a and 920b operably connected to mold cavity conveyors 960a and 960b operably connect to form mold cavity 920 of system 900. Hopper 922 is operably attached to two volumetric feeders 990a and 990b such that each volumetric feeder 990a and 990b fills mold cavity 920 partially with the matrix material along material path 910. Between the addition of matrix material from volumetric feeder 990a and volumetric feeder 990b injector 988 places a capsule (not shown) into mold cavity 920 thereby yielding a capsule surrounded by matrix material. Heating element 924, in thermal contact with mold cavity 920, causes the matrix material to mechanically bond at a plurality of points thereby yielding a porous mass with a capsule disposed therein. After the porous mass is formed, rotary grinder 992 is inserted into mold cavity 920 along the longitudinal direction of mold cavity 920. Rotary grinder 992 is operably capable of grinding the porous mass to a desired length in the longitudinal direction. After mold cavity 920 separates into mold cavity parts 920a and 920b, the porous mass is removed from mold cavity parts 920a and/or 920b and continues along material path 910 via porous mass conveyor 962.

Suitable capsules for use within porous masses (and the like) may include, but not be limited to, polymeric capsules, porous capsules, ceramic capsules, and the like. Capsules may be filled with an additive, e.g., granulated carbon or a flavorant (more examples provided below). The capsules, in some embodiments, may also contain a molecular sieve that reacts with selected components in the smoke to remove or reduce the concentration of the components without adversely affecting desirable flavor constituents of the smoke. In some embodiments, the capsules may include tobacco as an additional flavorant. One should note that if the capsule is insufficiently filled with a chosen substance, in some filter embodiments, this may create a lack of interaction between the components of the mainstream smoke and the substance in the capsules.

One skilled in the art, with the benefit of this disclosure, should understand that other methods described herein may be altered to produce porous mass sections, porous masses, and/or porous mass lengths with capsules therein. In some embodiments, more than one capsule may be within a porous mass section, porous mass, and/or porous mass length.

In some embodiments, the shape, e.g., length, width, diameter, and/or height, of porous mass sections, porous masses, and/or porous mass lengths may be adjusted by operations other than cutting including, but not limited to, sanding, milling, grinding, smoothing, polishing, rubbing, and the like, or any combination thereof. Generally these operations will be referred to herein as grinding. Some embodiments may involve grinding the sides and/or ends of porous mass sections, porous masses, and/or porous mass lengths to achieve smooth surfaces, roughened surfaces, grooved surfaces, patterned surfaces, leveled surfaces, or any combination thereof. Some embodiments may involve grinding the sides and/or ends of porous mass sections, porous masses, and/or porous mass lengths to achieve desired dimensions within specification limitations. Some embodiments may involve grinding the sides and/or ends of porous mass sections, porous masses, and/or porous mass lengths while in or exiting mold cavities, after cutting, during further processing, or any combination thereof. One skilled in the art should understand that dust, particles, and/or pieces may be produced from grinding. As such, grinding may involve removing the dust, particles, and/or pieces by methods like vacuuming, blowing gases, rinsing, shaking, and the like, or any combination thereof.

Any component and/or instrument capable of achieving the desired level of grinding may be used in conjunction with systems and methods disclosed herein. Examples of suitable components and/or instruments capable of achieving the desired level of grinding may include, but not be limited to, lathes, rotary sanders, brushes, polishers, buffers, etchers, scribes, and the like, or any combination thereof.

In some embodiments, the porous mass may be machined to be lighter in weight, if desired, for example, by drilling out a portion of the porous mass.

One skilled in the art, with the benefit of this disclosure, should understand the component and/or instrument configurations necessary to engage porous mass sections, porous masses, and/or porous mass lengths at various points with the systems described herein. By way of nonlimiting example, grinding instruments and/or drilling instruments used while porous masses are in mold cavities (or porous mass lengths are leaving mold cavities) should be configured so as not to deleteriously affect the mold cavity.

Figure 10:
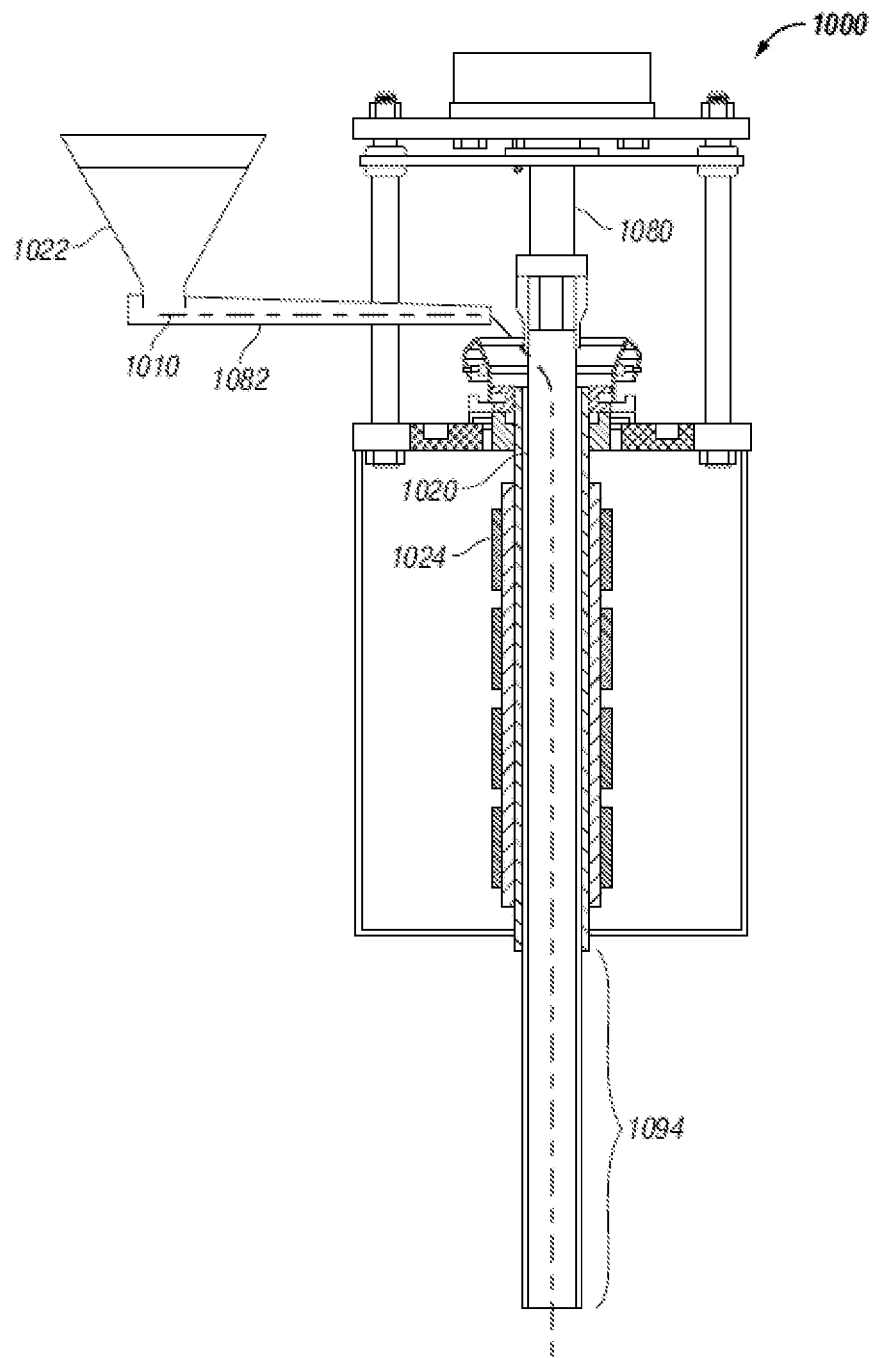
FIG. 10 illustrates a nonlimiting example of a system for forming porous masses according to the present invention (not necessarily to scale).

Referring now to FIG. 10, hopper 1022 is operably attached to chute 1082 and feeds the matrix material to material path 1010. Along material path 1010, mold cavity 1020 is configured to accept ram 1080 which is capable of pressing the matrix material in mold cavity 1020. Heating element 1024, in thermal communication with the matrix material while in mold cavity 1020, causes the matrix material to mechanically bond at a plurality of points thereby yielding a porous mass length. Inclusion of ram 1080 in system 1000 may advantageously assist in ensuring the matrix material is properly packed so as to form a porous mass length with a desired void volume. Further, system 1000 comprises cooling area 1094 while the porous mass length is still contained within mold cavity 1020. In this nonlimiting example, cooling is achieved passively.

Figure 11:
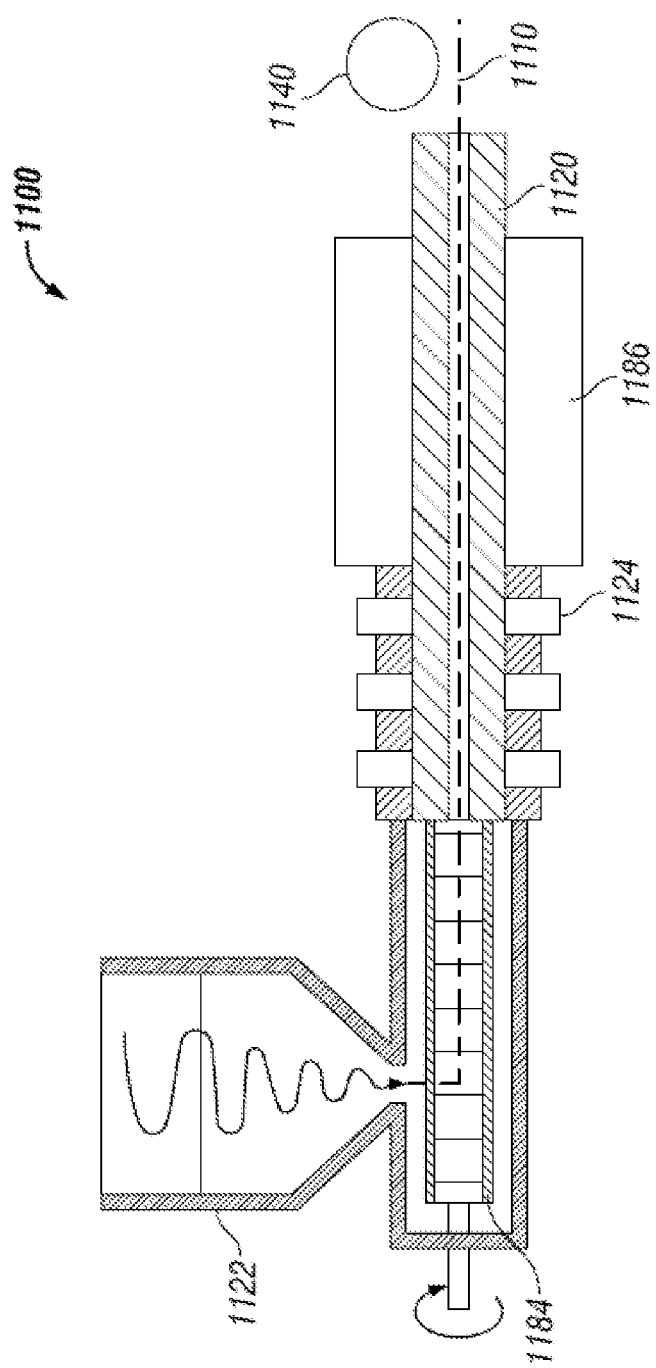
FIG. 11 illustrates a nonlimiting example of a system for forming porous masses according to the present invention (not necessarily to scale).

Referring now to FIG. 11, hopper 1122 of system 1100 operably feeds the matrix material to extruder 1184 along material path 1110. Extruder 1184 moves matrix material to mold cavity 1120. System 1100 also includes heating element 1124 in thermal communication with the matrix material while in mold cavity 1120 that causes the matrix material to mechanically bond at a plurality of points thereby yielding a porous mass length. Further, system 1100 includes cooling element 1186 in thermal communication porous mass length while in mold cavity 1120. Movement of the porous mass length out of mold cavity 1120 is assisted and/or directed by roller 1140.

In some embodiments, a control system may interface with components of the systems and/or apparatuses disclosed herein. As used herein, the term "control system" refers to a system that can operate to receive and send electronic signals and may include functions of interfacing with a user, providing data readouts, collecting data, storing data, changing variable setpoints, maintaining setpoints, providing notifications of failures, and any combination thereof. Suitable control systems may include, but are not limited to, variable transformers, ohmmeters, programmable logic controllers, digital logic circuits, electrical relays, computers, virtual reality systems, or any combination thereof. Suitable system and/or apparatus components that may be operably connected to a control system may include, but not be limited to, hoppers, heating elements, cooling elements, cutters, mixers, paper feeders, release feeders, release conveyors, rollers, mold cavity conveyors, conveyors, ejectors, liquid jets, air jets, rams, chutes, extruders, injectors, matrix material feeders, grinders, and the like, or any combination thereof. It should be noted that systems and/or apparatuses disclosed herein may have more than one control system that can interface with any number of components.

One skilled in the art, with the benefit of this disclosure, should understand the interchangeability of the various components of the systems and/or apparatuses disclosed herein. By way of nonlimiting example, heating elements may be interchanged with microwave sources when the matrix material comprises nanoparticles responsive to microwave radiation. Further by way of nonlimiting example, paper wrappers may be interchanged with release wrappers.

Some embodiments may involve further processing of porous mass sections, porous masses, and/or porous mass lengths (wrapped or otherwise). Suitable further processing may include, but not be limited to, doping with a flavorant or other additive, grinding, drilling out, further shaping, forming multi-segmented filters, forming smoking devices, packaging, shipping, or any combination thereof.

Some embodiments may involve doping matrix materials, porous mass sections, porous masses, and/or porous mass lengths (wrapped or otherwise) with an additive. Nonlimiting examples of additives are provided below. Suitable doping methods may include, but not be limited to, including the additives in the matrix material; by applying the additives to at least a portion of the matrix material before mechanical bonding; by applying the additives after mechanical bonding while in the mold cavity; by applying the additives after leaving the mold cavity; by applying the additives after cutting; or any combination thereof. It should be noted that applying includes, but is not limited to, dipping, immersing, submerging, soaking, rinsing, washing, painting, coating, showering, drizzling, spraying, placing, dusting, sprinkling, affixing, and any combination thereof. Further, it should be noted that applying includes, but is not limited to, surface treatments, infusion treatments where the additive incorporates at least partially into a component of the matrix material, or any combination thereof. One skilled in the art with the benefit of this disclosure should understand the concentration of the additive will depend at least on the composition of the additive, the size of the additive, the purpose of the additive, and the point in the process in which the additive is included.

In some embodiments, doping with an additive may occur before, during, and/or after mechanically bonding the matrix materials. One skilled in the art with the benefit of this disclosure should understand that additives which degrade, change, or are otherwise affected by the mechanical bonding process, e.g., elevated temperatures and/or pressures, should be added after mechanical bonding. By way of nonlimiting example, glass beads may be an additive in the matrix material. Then, after mechanical bonding, the glass beads may be functionalized with other additives like flavorants and/or active compounds.

Some embodiments may involve grinding porous mass sections, porous masses, and/or porous mass lengths (wrapped or otherwise) after being produced. Grinding includes those methods and apparatuses/components described above.

Some embodiments may involve operably connecting porous mass sections, porous masses, and/or porous mass lengths (wrapped or otherwise) to filters and/or filter sections. Suitable filters and/or filter sections may include, but not be limited to, those that comprise a section that comprises cavities, other porous masses, polypropylenes, polyethylenes, polyolefin tows, polypropylene tows, polyethylene terephthalates, polybutylene terephthalates, random oriented acetates, papers, corrugated papers, concentric filters, carbon-on-tow, silica, magnesium silicate, zeolites, molecular sieves, salts, catalysts, sodium chloride, nylon, flavorants, tobacco, capsules, cellulose, cellulosic derivatives, cellulose acetate, catalytic converters, iodine pentoxide, coarse powders, carbon particles, carbon fibers, fibers, glass beads, nanoparticles, void chambers, baffled void chambers, cellulose acetate tow with less than about 10 denier per filament, cellulose acetate tow with about 10 denier per filament or greater, or any combination thereof.

In some embodiments, a filter section may comprise a space that defines a cavity between two filter sections (one section including porous mass sections, porous masses, and/or porous mass lengths (wrapped or otherwise)). The cavity may be filled with an additive, e.g., granulated carbon or a flavorant. The cavity may contain a capsule, e.g., a polymeric capsule, that itself contains a flavorant or catalyst. The cavity, in some embodiments, may also contain a molecular sieve that reacts with selected components in the smoke to remove or reduce the concentration of the components without adversely affecting desirable flavor constituents of the smoke. In an embodiment, the cavity may include tobacco as an additional flavorant. One should note that if the cavity is insufficiently filled with a chosen substance, in some embodiments, this may create a lack of interaction between the components of the mainstream smoke and the substance in the cavity and in the other filter section(s).

Some embodiments may involve operably connecting smokeable substances to porous mass sections, porous masses, and/or porous mass lengths (wrapped or otherwise) (or segmented filters comprising at least one of the foregoing). In some embodiments, porous mass sections, porous masses, and/or porous mass lengths (wrapped or otherwise) (or segmented filters comprising at least one of the foregoing) may be in fluid communication with a smokeable substance. In some embodiments, a smoking device may comprise porous mass sections, porous masses, and/or porous mass lengths (wrapped or otherwise) (or segmented filters comprising at least one of the foregoing) in fluid communication with a smokeable substance. In some embodiments, a smoking device may comprise a housing operably capable of maintaining porous mass sections, porous masses, and/or porous mass lengths (wrapped or otherwise) (or segmented filters comprising at least one of the foregoing) in fluid communication with a smokeable substance. In some embodiments, filter rods, filters, filter sections, sectioned filters, and/or sectioned filter rods may be removable, replaceable, and/or disposable from the housing.

As used herein, the term "smokeable substance" refers to a material capable of producing smoke when burned or heated. Suitable smokeable substances may include, but not be limited to, tobaccos, e.g., bright leaf tobacco, Oriental tobacco, Turkish tobacco, Cavendish tobacco, corojo tobacco, criollo tobacco, Perique tobacco, shade tobacco, white burley tobacco, flue-cured tobacco, Burley tobacco, Maryland tobacco, Virginia tobacco; teas; herbs; carbonized or pyrolyzed components; inorganic filler components; or any combination thereof. Tobacco may have the form of tobacco laminae in cut filler form, processed tobacco stems, reconstituted tobacco filler, volume expanded tobacco filler, or the like. Tobacco, and other grown smokeable substances, may be grown in the United States, or may be grown in a jurisdiction outside the United States.

In some embodiments, a smokeable substance may be in a column format, e.g., a tobacco column. As used herein, the term "tobacco column" refers to the blend of tobacco, and optionally other ingredients and flavorants that may be combined to produce a tobacco-based smokeable article, such as a cigarette or cigar. In some embodiments, the tobacco column may comprise ingredients selected from the group consisting of: tobacco, sugar (such as sucrose, brown sugar, invert sugar, or high fructose corn syrup), propylene glycol, glycerol, cocoa, cocoa products, carob bean gums, carob bean extracts, and any combination thereof. In still other embodiments, the tobacco column may further comprise flavorants, aromas, menthol, licorice extract, diammonium phosphate, ammonium hydroxide, and any combination thereof. In some embodiments, tobacco columns may comprise additives. In some embodiments, tobacco columns may comprise at least one bendable element.

Suitable housings may include, but not be limited to, cigarettes, cigarette holders, cigars, cigar holders, pipes, water pipes, hookahs, electronic smoking devices, roll-your-own cigarettes, roll-your-own cigars, papers, or any combination thereof.

Packaging porous mass sections, porous masses, and/or porous mass lengths (wrapped or otherwise) may include, but not be limited to, placing in trays or boxes or protective containers, e.g., trays typically used for packaging and transporting cigarette filter rods.

In some embodiments, the present invention provides a pack of filters and/or smoking devices with filters that comprises porous mass sections, porous masses, and/or porous mass lengths (wrapped or otherwise). The pack may be a hinge-lid pack, a slide-and-shell pack, a hard cup pack, a soft cup pack, a plastic bag, or any other suitable pack container. In some embodiments, the packs may have an outer wrapping, such as a polypropylene wrapper, and optionally a tear tab. In some embodiments, the filters and/or smoking devices may be sealed as a bundle inside a pack. A bundle may contain a number of filters and/or smoking devices, for example, 20 or more. However, a bundle may include a single filter and/or smoking device, in some embodiments, such as exclusive filter and/or smoking device embodiments like those for individual sale, or a filter and/or smoking device comprising a specific spice, like vanilla, clove, or cinnamon.

In some embodiments, the present invention provides a carton of smoking device packs that includes at least one pack of smoking devices that includes at least one smoking device with a filter (multi-segmented or otherwise) that comprises porous mass sections, porous masses, and/or porous mass lengths (wrapped or otherwise). In some embodiments, the carton (e.g., a container) has the physical integrity to contain the weight from the packs of smoking devices. This may be accomplished through thicker cardstock being used to form the carton or stronger adhesives being used to bind elements of the carton.

Some embodiments may involve shipping porous mass sections, porous masses, and/or porous mass lengths (wrapped or otherwise). Said porous mass sections, porous masses, and/or porous mass lengths (wrapped or otherwise) may be as individuals, as at least a portion of filters, as at least a portion of smoking devices, in packs, in carton, in trays, or any combination thereof. Shipping may be by train, truck, airplane, boat/ship, or any combination thereof.

In some embodiments, porous mass sections, porous masses, and/or porous mass lengths (wrapped or otherwise) may have a void volume in the range of about 40% to about 90%. In some embodiments, porous mass sections, porous masses, and/or porous mass lengths (wrapped or otherwise) may have a void volume of about 60% to about 90%. In some embodiments, porous mass sections, porous masses, and/or porous mass lengths (wrapped or otherwise) may have a void volume of about 60% to about 85%. Void volume is the free space left after accounting for the space taken by the active particles.

To determine void volume, although not wishing to be limited by any particular theory, it is believed that testing indicates that the final density of the mixture was driven almost entirely by the active particle; thus the space occupied by the binder particles was not considered for this calculation. Thus, void volume, in this context, is calculated based on the space remaining after accounting for the active particles. To determine void volume, first the upper and lower diameters based on the mesh size were averaged for the active particles, and then the volume was calculated (assuming a spherical shape based on that averaged diameter) using the density of the active material. Then, the percentage void volume is calculated as follows:

$$\text{Void Volume}(\%) = 1 - \frac{\left[\begin{array}{c}(\text{porous mass volume, cm}^3) - \\ (\text{Weight of active particles, } gm)/ \\ (\text{density of the active particles, } gm/\text{cm}^3)\end{array}\right] * 100}{\text{porous mass volume, cm}^3}$$

In some embodiments, porous mass sections, porous masses, and/or porous mass lengths (wrapped or otherwise) may have an encapsulated pressure drop (EPD) in the range of about 0.10 to about 25 mm of water per mm length of porous mass. In some embodiments, porous mass sections, porous masses, and/or porous mass lengths (wrapped or otherwise) may have an EPD in the range of about 0.10 to about 10 mm of water per mm length of porous mass. In some embodiments, porous mass sections, porous masses, and/or porous mass lengths (wrapped or otherwise) may have an EPD of about 2 to about 7 mm of water per mm length of porous mass (or no greater than 7 mm of water per mm length of porous mass).

In some embodiments, porous mass sections, porous masses, and/or porous mass lengths (wrapped or otherwise) may have an active particle loading of at least about 1 mg/mm, 2 mg/mm, 3 mg/mm, 4 mg/mm, 5 mg/mm, 6 mg/mm, 7 mg/mm, 8 mg/mm, 9 mg/mm, 10 mg/mm, 11 mg/mm, 12 mg/mm, 13 mg/mm, 14 mg/mm, 15 mg/mm, 16 mg/mm, 17 mg/mm, 18 mg/mm, 19 mg/mm, 20 mg/mm, 21 mg/mm, 22 mg/mm, 23 mg/mm, 24 mg/mm, or 25 mg/mm in combination with an EPD of less than about 20 mm of water or less per mm of length, 19 mm of water or less per mm of length, 18 mm of water or less per mm of length, 17 mm of water or less per mm of length, 16 mm of water or less per mm of length, 15 mm of water or less per mm of length, 14 mm of water or less per mm of length, 13 mm of water or less per mm of length, 12 mm of water or less per mm of length, 11 mm of water or less per mm of length, 10 mm of water or less per mm of length, 9 mm of water or less per mm of length, 8 mm of water or less per mm of length, 7 mm of water or less per mm of length, 6 mm of water or less per mm of length, 5 mm of water or less per mm of length, 4 mm of water or less per mm of length, 3 mm of water or less per mm of length, 2 mm of water or less per mm of length, or 1 mm of water or less per mm of length.

By way of example, in some embodiments, porous mass sections, porous masses, and/or porous mass lengths (wrapped or otherwise) may have an active particle loading of at least about 1 mg/mm and an EPD of about 20 mm of water or less per mm of length. In other embodiments, the porous mass may have an active particle loading of at least about 1 mg/mm and an EPD of about 20 mm of water or less per mm of length, wherein the active particle is not carbon. In other embodiments, the porous mass may have an active particle comprising carbon with a loading of at least 6 mg/mm in combination with an EPD of 10 mm of water or less per mm of length.

In some embodiments, porous mass sections, porous masses, and/or porous mass lengths (wrapped or otherwise) may be effective at the removal of components from smoke, for example, those in the listing herein. Porous mass sections, porous masses, and/or porous mass lengths (wrapped or otherwise) may be used to reduce the delivery of certain tobacco smoke components targeted by the WHO. By way of nonlimiting example, a porous mass where activated carbon is used as the active particles can be used to reduce the delivery of certain tobacco smoke components to levels below the WHO recommendations. The components may include, but not be limited to, acetaldehyde, acrolein, benzene, benzo[a]pyrene, 1,3-butadiene, and formaldehyde. Porous mass sections, porous masses, and/or porous mass lengths (wrapped or otherwise) with activated carbon may reduce acetaldehydes in a smoke stream by about 3.0% to about 6.5%/mm length of porous mass; acrolein in a smoke stream by about 7.5% to about 12%/mm length of porous mass; benzene in a smoke stream by about 5.5% to about 8.0%/mm length of porous mass; benzo[a]pyrene in a smoke stream by about 9.0% to about 21.0%/mm length of porous mass; 1,3-butadiene in a smoke stream by about 1.5% to about 3.5%/mm length of porous mass; and formaldehyde in a smoke stream by about 9.0% to about 11.0%/mm length of porous mass. In another example, porous mass sections, porous masses, and/or porous mass lengths (wrapped or otherwise) where an ion exchange resin is used as the active particles can be used to reduce the delivery of certain tobacco smoke components to below the WHO recommendations. In some embodiments, porous mass sections, porous masses, and/or porous mass lengths (wrapped or otherwise) having an ion exchange resin may reduce: acetaldehydes in a smoke stream by about 5.0% to about 7.0%/mm length of porous mass; acrolein in a smoke stream by about 4.0% to about 6.5%/mm length of porous mass; and formaldehyde in a smoke stream by about 9.0% to about 11.0%/mm length of porous mass.

There may be any weight ratio of active particles to binder particles in the matrix material. In some embodiments, the matrix material may comprise active particles in an amount ranging from a lower limit of about 1 wt %, 5 wt %, 10 wt %, 25 wt %, 40 wt %, 50 wt %, 60 wt %, or 75 wt % of the matrix material to an upper limit of about 99 wt %, 95 wt %, 90 wt %, or 75 wt % of the matrix material, and wherein the amount of active particles can range from any lower limit to any upper limit and encompass any subset therebetween. In some embodiments, the matrix material may comprise binder particles in an amount ranging from a lower limit of about 1 wt %, 5 wt %, 10 wt %, or 25 wt % of the matrix material to an upper limit of about 99 wt %, 95 wt %, 90 wt %, 75 wt %, 60 wt %, 50 wt %, 40 wt %, or 25 wt % of the matrix material, and wherein the amount of binder particles can range from any lower limit to any upper limit and encompass any subset therebetween.

The active particles may be any material adapted to enhance smoke flowing thereover. Adapted to enhance smoke flowing thereover refers to any material that can remove, reduce, or add components to a smoke stream. The removal or reduction (or addition) may be selective. By way of example, in the smoke stream from a cigarette, compounds such as those shown below in the following listing may be selectively removed or reduced. This table is available from the U.S. FDA as a Draft Proposed Initial List of Harmful/Potentially Harmful Constituents in Tobacco Products, including Tobacco Smoke; any abbreviations in the below listing are well-known chemicals in the art. In some embodiments, the active particle may reduce or remove at least one component selected from the listing of components in smoke below, including any combination thereof. Smoke stream components may include, but not be limited to, acetaldehyde, acetamide, acetone, acrolein, acrylamide, acrylonitrile, aflatoxin B-1, 4-aminobiphenyl, 1-aminonaphthalene, 2-aminonaphthalene, ammonia, ammonium salts, anabasine, anatabine, 0-anisidine, arsenic, A-α-C, benz[a]anthracene, benz[b]fluoroanthene, benz[j]aceanthrylene, benz[k]fluoroanthene, benzene, benzo[b]furan, benzo[a]pyrene, benzo[c]phenanthrene, beryllium, 1,3-butadiene, butyraldehyde, cadmium, caffeic acid, carbon monoxide, catechol, chlorinated dioxins/furans, chromium, chrysene, cobalt, coumarin, a cresol, crotonaldehyde, cyclopenta[c,d]pyrene, dibenz(a,h)acridine, dibenz(a,j)acridine, dibenz[a,h]anthracene, dibenzo(c,g)carbazole, dibenzo[a,e]pyrene, dibenzo[a,h]pyrene, dibenzo[a,i]pyrene, dibenzo[a,l]pyrene, 2,6-dimethylaniline, ethyl carbamate (urethane), ethylbenzene, ethylene oxide, eugenol, formaldehyde, furan, glu-P-1, glu-P-2, hydrazine, hydrogen cyanide, hydroquinone, indeno[1,2,3-cd]pyrene, IQ, isoprene, lead, MeA-α-C, mercury, methyl ethyl ketone, 5-methylchrysene, 4-(methylnitrosamino)-1-(3-pyridyl)-1-butanone (NNK), 4-(methylnitrosamino)-1-(3-pyridyl)-1-butanol (NNAL), naphthalene, nickel, nicotine, nitrate, nitric oxide, a nitrogen oxide, nitrite, nitrobenzene, nitromethane, 2-nitropropane, N-nitrosoanabasine (NAB), N-nitrosodiethanolamine (NDELA), N-nitrosodiethylamine, N-nitrosodimethylamine (NDMA), N-nitrosoethylmethylamine, N-nitrosomorpholine (NMOR), N-nitrosonornicotine (NNN), N-nitrosopiperidine (NPIP), N-nitrosopyrrolidine (NPYR), N-nitrososarcosine (NSAR), phenol, PhIP, polonium-210 (radio-isotope), propionaldehyde, propylene oxide, pyridine, quinoline, resorcinol, selenium, styrene, tar, 2-toluidine, toluene, Trp-P-1, Trp-P-2, uranium-235 (radio-isotope), uranium-238 (radio-isotope), vinyl acetate, vinyl chloride, and any combination thereof.

One example of an active material is activated carbon (or activated charcoal or active coal). The activated carbon may be low activity (about 50% to about 75% $CCl_4$ adsorption) or high activity (about 75% to about 95% $CCl_4$ adsorption) or a combination of both. In some embodiments, the active carbon may be nano-scaled carbon particle, such as carbon nanotubes of any number of walls, carbon nanohorns, bamboo-like carbon nanostructures, fullerenes and fullerene aggregates, and graphene including few layer graphene and oxidized graphene. Other examples of such materials include ion exchange resins, desiccants, silicates, molecular sieves, silica gels, activated alumina, zeolites, perlite, sepiolite, Fuller's Earth, magnesium silicate, metal oxides (e.g., iron oxide and iron oxide nanoparticles like about 12 nm $Fe_3O_4$), nanoparticles (e.g., metal nanoparticles like gold and silver; metal oxide nanoparticles like alumina; magnetic, paramagnetic, and superparamagentic nanoparticles like gadolinium oxide, various crystal structures of iron oxide like hematite and magnetite, gado-nanotubes, and endofullerenes like $Gd@C_{60}$; and core-shell and onionated nanoparticles like gold and silver nanoshells, onionated iron oxide, and other nanoparticles or microparticles with an outer shell of any of said materials) and any combination of the foregoing (including activated carbon). It should be noted that nanoparticles include nanorods, nanospheres, nanorices, nanowires, nanostars (like nanotripods and nanotetrapods), hollow nanostructures, hybrid nanostructures that are two or more nanoparticles connected as one, and non-nano particles with nano-coatings or nano-thick walls. It should be further noted that nanoparticles include the functionalized derivatives of nanoparticles including, but not limited to, nanoparticles that have been functionalized covalently and/or non-covalently, e.g., pi-stacking, physisorption, ionic association, van der Waals association, and the like. Suitable functional groups may include, but not be limited to, moieties comprising amines (1°, 2°, or 3°), amides, carboxylic acids, aldehydes, ketones, ethers, esters, peroxides, silyls, organosilanes, hydrocarbons, aromatic hydrocarbons, and any combination thereof; polymers; chelating agents like ethylenediamine tetraacetate, diethylenetriaminepentaacetic acid, triglycollamic acid, and a structure comprising a pyrrole ring; and any combination thereof. Functional groups may enhance removal of smoke components and/or enhance incorporation of nanoparticles into a porous mass. Ion exchange resins include, for example, a polymer with a backbone, such as styrene-divinyl benzene (DVB) copolymer, acrylates, methacrylates, phenol formaldehyde condensates, and epichlorohydrin amine condensates; and a plurality of electrically charged functional groups attached to the polymer backbone. In some embodiments, the active particles are a combination of various active particles. In some embodiments, the porous mass may comprise multiple active particles. In some embodiments, an active particle may comprise at least one element selected from the group of active particles disclosed herein. It should be noted that "element" is being used as a general term to describe items in a list. In some embodiments, the active particles are combined with at least one flavorant.

Suitable active particles may have at least one dimension of about less than one nanometer, such as graphene, to as large as a particle having a diameter of about 5000 microns. Active particles may range from a lower size limit in at least one dimension of about: 0.1 nanometers, 0.5 nanometers, 1 nanometer, 10 nanometers, 100 nanometers, 500 nanometers, 1 micron, 5 microns, 10 microns, 50 microns, 100 microns, 150 microns, 200 microns, and 250 microns. The active particles may range from an upper size limit in at least one dimension of about: 5000 microns, 2000 microns, 1000 microns, 900 microns, 700 microns, 500 microns, 400 microns, 300 microns, 250 microns, 200 microns, 150 microns, 100 microns, 50 microns, 10 microns, and 500 nanometers. Any combination of lower limits and upper limits above may be suitable for use in the present invention, wherein the selected maximum size is greater than the selected minimum size. In some embodiments, the active particles may be a mixture of particle sizes ranging from the above lower and upper limits. In some embodiments, the size of the active particles may be polymodal.

The binder particles may be any suitable thermoplastic binder particles. In one embodiment, the binder particles exhibit virtually no flow at its melting temperature. This means a material that when heated to its melting temperature exhibits little to no polymer flow. Materials meeting these criteria include, but are not limited to, ultrahigh molecular weight polyethylene, very high molecular weight polyethylene, high molecular weight polyethylene, and combinations thereof. In one embodiment, the binder particles have a melt flow index (MFI, ASTM D1238) of less than or equal to about 3.5 g/10 min at 190° C. and 15 Kg (or about 0-3.5 g/10 min at 190° C. and 15 Kg). In another embodiment, the binder particles have a melt flow index (MFI) of less than or equal to about 2.0 g/10 min at 190° C. and 15 Kg (or about 0-2.0 g/10 min at 190° C. and 15 Kg). One example of such a material is ultra high molecular weight polyethylene, UHMWPE (which has no polymer flow, MFI of about 0, at 190° C. and 15 Kg, or an MFI of about 0-1.0 at 190° C. and 15 Kg); another material may be very high molecular weight polyethylene, VHMWPE (which may have MFIs in the range of, for example, about 1.0-2.0 g/10 min at 190° C. and 15 Kg); or high molecular weight polyethylene, HMWPE (which may have MFIs of, for example, about 2.0-3.5 g/10 min at 190° C. and 15 Kg). In some embodiments, it may be preferable to use a mixture of binder particles having different molecular weights and/or different melt flow indexes.

In terms of molecular weight, "ultra-high molecular weight polyethylene" as used herein refers to polyethylene compositions with weight-average molecular weight of at least about $3 \times 10^6$ g/mol. In some embodiments, the molecular weight of the ultra-high molecular weight polyethylene composition is between about $3 \times 10^6$ g/mol and about $30 \times 10^6$ g/mol, or between about $3 \times 10^6$ g/mol and about $20 \times 10^6$ g/mol, or between about $3 \times 10^6$ g/mol and about $10 \times 10^6$ g/mol, or between about $3 \times 10^6$ g/mol and about $6 \times 10^6$ g/mol. "Very-high molecular weight polyethylene" refers to polyethylene compositions with a weight average molecular weight of less than about $3 \times 10^6$ g/mol and more than about $1 \times 10^6$ g/mol. In some embodiments, the molecular weight of the very-high molecular weight polyethylene composition is between about $2 \times 10^6$ g/mol and less than about $3 \times 10^6$ g/mol. "High molecular weight polyethylene" refers to polyethylene compositions with weight-average molecular weight of at least about $3 \times 10^5$ g/mol to $1 \times 10^6$ g/mol. For purposes of the present specification, the molecular weights referenced herein are determined in accordance with the Margolies equation ("Margolies molecular weight").

Suitable polyethylene materials are commercially available from several sources including GUR® UHMWPE from Ticona Polymers LLC, a division of Celanese Corporation of Dallas, Tex., and DSM (Netherland), Braskem (Brazil), Beijing Factory No. 2 (BAAF), Shanghai Chemical, and Qilu (People's Republic of China), Mitsui and Asahi (Japan). Specifically, GUR polymers may include: GUR 2000 series (2105, 2122, 2122-5, 2126), GUR 4000 series (4120, 4130, 4150, 4170, 4012, 4122-5, 4022-6, 4050-3/4150-3), GUR 8000 series (8110, 8020), GUR X series (X143, X184, X168, X172, X192).

One example of a suitable polyethylene material is that having an intrinsic viscosity in the range of about 5 dl/g to about 30 dl/g and a degree of crystallinity of about 80% or more as described in U.S. Patent Application Publication No. 2008/0090081. Another example of a suitable polyethylene material is that having a molecular weight in the range of about 300,000 g/mol to about 2,000,000 g/mol as determined by ASTM-D 4020, an average particle size, $D_{50}$, between about 300 μm and about 1500 μm, and a bulk density between about 0.25 g/ml and about 0.5 g/ml as described in U.S. Provisional Application No. 61/330,535 filed May 3, 2010.

The binder particles may assume any shape. Such shapes include spherical, hyperion, asteroidal, chrondular or interplanetary dust-like, granulated, potato, irregular, or combinations thereof. In preferred embodiments, the binder particles suitable for use in the present invention are non-fibrous. In some embodiments the binder particles are in the form of a powder, pellet, or particulate. In some embodiments, the binder particles are a combination of various binder particles.

In some embodiments, the binder particles may range from a lower size limit in at least one dimension of about: 0.1 nanometers, 0.5 nanometers, 1 nanometer, 10 nanometers, 100 nanometers, 500 nanometers, 1 micron, 5 microns, 10 microns, 50 microns, 100 microns, 150 microns, 200 microns, and 250 microns. The binder particles may range from an upper size limit in at least one dimension of about: 5000 microns, 2000 microns, 1000 microns, 900 microns, 700 microns, 500 microns, 400 microns, 300 microns, 250 microns, 200 microns, 150 microns, 100 microns, 50 microns, 10 microns, and 500 nanometers. Any combination of lower limits and upper limits above may be suitable for use in the present invention, wherein the selected maximum size is greater than the selected minimum size. In some embodiments, the binder particles may be a mixture of particle sizes ranging from the above lower and upper limits.

While the ratio of binder particle size to active particle size can include any iteration as dictated by the size ranges for each described herein, specific size ratios may be advantageous for specific applications and/or products. By way of nonlimiting example, in smoking device filters the sizes of the active particles and binder particles should be such that the EPD allows for drawing fluids through the porous mass. In some embodiments, the ratio of binder particle size to active particle size may range from about 10:1 to about 1:10, or more preferably range from about 1:1.5 to about 1:4.

Additionally, the binder particles may have a bulk density in the range of about 0.10 g/cm$^3$ to about 0.55 g/cm$^3$. In another embodiment, the bulk density may be in the range of about 0.17 g/cm$^3$ to about 0.50 g/cm$^3$. In yet another embodiment, the bulk density may be in the range of about 0.20 g/cm$^3$ to about 0.47 g/cm$^3$.

In addition to the foregoing binder particles, other conventional thermoplastics may be used as binder particles. Such thermoplastics include, but are not limited to, polyolefins, polyesters, polyamides (or nylons), polyacrylics, polystyrenes, polyvinyls, polytetrafluoroethylene (PTFE), polyether ether ketone (PEEK), any copolymer thereof, any derivative thereof, and any combination thereof. Non-fibrous plasticized cellulose derivatives may also be suitable for use as binder particles in the present invention. Examples of suitable polyolefins include, but are not limited to, polyethylene, polypropylene, polybutylene, polymethylpentene, any copolymer thereof, any derivative thereof, any combination thereof and the like. Examples of suitable polyethylenes further include low-density polyethylene, linear low-density polyethylene, high-density polyethylene, any copolymer thereof, any derivative thereof, any combination thereof and the like. Examples of suitable polyesters include polyethylene terephthalate, polybutylene terephthalate, polycyclohexylene dimethylene terephthalate, polytrimethylene terephthalate, any copolymer thereof, any derivative thereof, any combination thereof and the like. Examples of suitable polyacrylics include, but are not limited to, polymethyl methacrylate, any copolymer thereof, any derivative thereof, any combination thereof and the like. Examples of suitable polystyrenes include, but are not limited to, polystyrene, acrylonitrile-butadiene-styrene, styrene-acrylonitrile, styrene-butadiene, styrene-maleic anhydride, any copolymer thereof, any derivative thereof, any combination thereof and the like. Examples of suitable polyvinyls include, but are not limited to, ethylene vinyl acetate, ethylene vinyl alcohol, polyvinyl chloride, any copolymer thereof, any derivative thereof, any combination thereof and the like. Examples of suitable cellulosics include, but are not limited to, cellulose acetate, cellulose acetate butyrate, plasticized cellulosics, cellulose propionate, ethyl cellulose, any copolymer thereof, any derivative thereof, any combination thereof and the like. In some embodiments, a binder particle may be any copolymer, any derivative, and any combination of the above listed binders.

In some embodiments, matrix materials and/or porous masses may comprise active particles, binder particles, and additives. In some embodiments, the matrix material or porous masses may comprise additives in an amount ranging from a lower limit of about 0.01 wt %, 0.05 wt %, 0.1 wt %, 1 wt %, 5 wt %, or 10 wt % of the matrix material or porous masses to an upper limit of about 25 wt %, 15 wt %, 10 wt %, 5 wt %, or 1 wt % of the matrix material or porous masses, and wherein the amount of additives can range from any lower limit to any upper limit and encompass any subset therebetween. It should be noted that porous masses as referenced herein include porous mass lengths, porous masses, and porous mass sections (wrapped or otherwise).

Suitable additives may include, but not be limited to, active compounds, ionic resins, zeolites, nanoparticles, ceramic particles, glass beads, softening agents, plasticizers, pigments, dyes, flavorants, aromas, controlled release vesicles, adhesives, tackifiers, surface modification agents, vitamins, peroxides, biocides, antifungals, antimicrobials, antistatic agents, flame retardants, degradation agents, and any combination thereof.

Suitable active compounds may be compounds and/or molecules suitable for removing components from a smoke stream including, but not limited to, malic acid, potassium carbonate, citric acid, tartaric acid, lactic acid, ascorbic acid, polyethyleneimine, cyclodextrin, sodium hydroxide, sulphamic acid, sodium sulphamate, polyvinyl acetate, carboxylated acrylate, and any combination thereof. It should be noted that an active particle may also be considered an active compound, and vice versa. By way of nonlimiting example, fullerenes and some carbon nanotubes may be considered to be a particulate and a molecule.

Suitable ionic resins may include, but not be limited to, polymers with a backbone, such as styrene-divinyl benezene (DVB) copolymer, acrylates, methacrylates, phenol formaldehyde condensates, and epichlorohydrin amine condensates; a plurality of electrically charged functional groups attached to the polymer backbone; and any combination thereof.

Zeolites may include crystalline aluminosilicates having pores, e.g., channels, or cavities of uniform, molecular-sized dimensions. Zeolites may include natural and synthetic materials. Suitable zeolites may include, but not be limited to, zeolite BETA ($Na_7(Al_7Si_{57}O_{128})$ tetragonal), zeolite ZSM-5 ($Na_n(Al_nSi_{96-n}O_{192})$ 16 $H_2O$, with n<27), zeolite A, zeolite X, zeolite Y, zeolite K-G, zeolite ZK-5, zeolite ZK-4, mesoporous silicates, SBA-15, MCM-41, MCM48 modified by 3-aminopropylsilyl groups, alumino-phosphates, mesoporous aluminosilicates, other related porous materials (e.g., such as mixed oxide gels), or any combination thereof.

Suitable nanoparticles may include, but not be limited to, nano-scaled carbon particles like carbon nanotubes of any number of walls, carbon nanohorns, bamboo-like carbon nanostructures, fullerenes and fullerene aggregates, and graphene including few layer graphene and oxidized graphene; metal nanoparticles like gold and silver; metal oxide nanoparticles like alumina, silica, and titania; magnetic, paramagnetic, and superparamagentic nanoparticles like gadolinium oxide, various crystal structures of iron oxide like hematite and magnetite, about 12 nm $Fe_3O_4$, gado-nanotubes, and endofullerenes like $Gd@C_{60}$; and core-shell and onionated nanoparticles like gold and silver nanoshells, onionated iron oxide, and other nanoparticles or microparticles with an outer shell of any of said materials) and any combination of the foregoing (including activated carbon). It should be noted that nanoparticles may include nanorods, nanospheres, nanorices, nanowires, nanostars (like nanotripods and nanotetrapods), hollow nanostructures, hybrid nanostructures that are two or more nanoparticles connected as one, and non-nano particles with nano-coatings or nano-thick walls. It should be further noted that nanoparticles may include the functionalized derivatives of nanoparticles including, but not limited to, nanoparticles that have been functionalized covalently and/or non-covalently, e.g., pi-stacking, physisorption, ionic association, van der Waals association, and the like. Suitable functional groups may include, but not be limited to, moieties comprising amines (1°, 2°, or 3°), amides, carboxylic acids, aldehydes, ketones, ethers, esters, peroxides, silyls, organosilanes, hydrocarbons, aromatic hydrocarbons, and any combination thereof; polymers; chelating agents like ethylenediamine tetraacetate, diethylenetriaminepentaacetic acid, triglycollamic acid, and a structure comprising a pyrrole ring; and any combination thereof. Functional groups may enhance removal of smoke components and/or enhance incorporation of nanoparticles into a porous mass.

Suitable ceramic particles may include, but not be limited to, oxides (e.g., silica, titania, alumina, beryllia, ceria, and zirconia), nonoxides (e.g., carbides, borides, nitrides, and silicides), composites thereof, or any combination thereof. Ceramic particles may be crystalline, non-crystalline, or semi-crystalline.

As used herein, pigments refer to compounds and/or particles that impart color and are incorporated throughout the matrix material and/or a component thereof. Suitable pigments may include, but not be limited to, titanium dioxide, silicon dioxide, tartrazine, E102, phthalocyanine blue, phthalocyanine green, quinacridones, perylene tetracarboxylic acid di-imides, dioxazines, perinones disazo pigments, anthraquinone pigments, carbon black, titanium dioxide, metal powders, iron oxide, ultramarine, or any combination thereof.

As used herein, dyes refer to compounds and/or particles that impart color and are a surface treatment. Suitable dyes may include, but not be limited to, CARTASOL® dyes (cationic dyes, available from Clariant Services) in liquid and/or granular form (e.g., CARTASOL® Brilliant Yellow K-6G liquid, CARTASOL® Yellow K-4GL liquid, CARTASOL® Yellow K-GL liquid, CARTASOL® Orange K-3GL liquid, CARTASOL® Scarlet K-2GL liquid, CARTASOL® Red K-3BN liquid, CARTASOL® Blue K-5R liquid, CARTASOL® Blue K-RL liquid, CARTASOL®Turquoise K-RL liquid/granules, CARTASOL® Brown K-BL liquid), FASTUSOL® dyes (an auxochrome, available from BASF) (e.g., Yellow 3GL, Fastusol C Blue 74L).

Suitable flavorants may be any flavorant suitable for use in smoking device filters including those that impart a taste and/or a flavor to the smoke stream. Suitable flavorants may include, but not be limited to, organic material (or naturally flavored particles), carriers for natural flavors, carriers for artificial flavors, and any combination thereof. Organic materials (or naturally flavored particles) include, but are not limited to, tobacco, cloves (e.g., ground cloves and clove flowers), cocoa, and the like. Natural and artificial flavors may include, but are not limited to, menthol, cloves, cherry, chocolate, orange, mint, mango, vanilla, cinnamon, tobacco, and the like. Such flavors may be provided by menthol, anethole (licorice), anisole, limonene (citrus), eugenol (clove), and the like, or any combination thereof. In some embodiments, more than one flavorant may be used including any combination of the flavorants provided herein. These flavorants may be placed in the tobacco column or in a section of a filter. Additionally, in some embodiments, the porous masses of the present invention may comprise a flavorant. The amount to include will depend on the desired level of flavor in the smoke taking into account all filter sections, the length of the smoking device, the type of smoking device, the diameter of the smoking device, as well as other factors known to those of skill in the art.

Suitable aromas may include, but not be limited to, methyl formate, methyl acetate, methyl butyrate, ethyl acetate, ethyl butyrate, isoamyl acetate, pentyl butyrate, pentyl pentanoate, octyl acetate, myrcene, geraniol, nerol, citral, citronellal, citronellol, linalool, nerolidol, limonene, camphor, terpineol, alpha-ionone, thujone, benzaldehyde, eugenol, cinnamaldehyde, ethyl maltol, vanilla, anisole, anethole, estragole, thymol, furaneol, methanol, or any combination thereof.

Suitable tackifiers may include, but not be limited to, methylcellulose, ethylcellulose, hydroxyethylcellulose, carboxy methylcellulose, carboxy ethylcellulose, water-soluble cellulose acetate, amides, diamines, polyesters, polycarbonates, silyl-modified polyamide compounds, polycarbamates, urethanes, natural resins, shellacs, acrylic acid polymers, 2-ethylhexylacrylate, acrylic acid ester polymers, acrylic acid derivative polymers, acrylic acid homopolymers, anacrylic acid ester homopolymers, poly(methyl acrylate), poly(butyl acrylate), poly(2-ethylhexyl acrylate), acrylic acid ester co-polymers, methacrylic acid derivative polymers, methacrylic acid homopolymers, methacrylic acid ester homopolymers, poly(methyl methacrylate), poly(butyl methacrylate), poly(2-ethylhexyl methacrylate), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate co-polymers, benzyl coco di-(hydroxyethyl) quaternary amines, p-T-amyl-phenols condensed with formaldehyde, dialkyl amino alkyl (meth)acrylates, acrylamides, N-(dialkyl amino alkyl) acrylamide, methacrylamides, hydroxy alkyl (meth)acrylates, methacrylic acids, acrylic acids, hydroxyethyl acrylates, and the like, any derivative thereof, or any combination thereof.

Suitable vitamins may include, but not be limited to, vitamin A, vitamin B1, vitamin B2, vitamin C, vitamin D, vitamin E, or any combination thereof.

Suitable antimicrobials may include, but not be limited to, anti-microbial metal ions, chlorhexidine, chlorhexidine salt, triclosan, polymoxin, tetracycline, amino glycoside (e.g., gentamicin), rifampicin, bacitracin, erythromycin, neomycin, chloramphenicol, miconazole, quinolone, penicillin, nonoxynol 9, fusidic acid, cephalosporin, mupirocin, metronidazolea secropin, protegrin, bacteriolcin, defensin, nitrofurazone, mafenide, acyclovir, vanocmycin, clindamycin, lincomycin, sulfonamide, norfloxacin, pefloxacin, nalidizic acid, oxalic acid, enoxacin acid, ciprofloxacin, polyhexamethylene biguanide (PHMB), PHMB derivatives (e.g., biodegradable biguanides like polyethylene hexamethylene biguanide (PEHMB)), clilorhexidine gluconate, chlorohexidine hydrochloride, ethylenediaminetetraacetic acid (EDTA), EDTA derivatives (e.g., disodium EDTA or tetrasodium EDTA), the like, and any combination thereof.

Antistatic agents may comprise any suitable anionic, cationic, amphoteric or nonionic antistatic agent. Anionic antistatic agents may generally include, but not be limited to, alkali sulfates, alkali phosphates, phosphate esters of alcohols, phosphate esters of ethoxylated alcohols, or any combination thereof. Examples may include, but not be limited to, alkali neutralized phosphate ester (e.g., TRYFAC® 5559 or TRYFRAC® 5576, available from Henkel Corporation, Mauldin, S.C.). Cationic antistatic agents may generally include, but not be limited to, quaternary ammonium salts and imidazolines which possess a positive charge. Examples of nonionics include the poly(oxyalkylene) derivatives, e.g., ethoxylated fatty acids like EMEREST® 2650 (an ethoxylated fatty acid, available from Henkel Corporation, Mauldin, S.C.), ethoxylated fatty alcohols like TRYCOL® 5964 (an ethoxylated lauryl alcohol, available from Henkel Corporation, Mauldin, S.C.), ethoxylated fatty amines like TRYMEEN® 6606 (an ethoxylated tallow amine, available from Henkel Corporation, Mauldin, S.C.), alkanolamides like EMID® 6545 (an oleic diethanolamine, available from Henkel Corporation, Mauldin, S.C.), or any combination thereof. Anionic and cationic materials tend to be more effective antistatic agents.

It should be noted that while porous masses, and the like, are discussed herein primarily for smoking device filters, porous masses, and the like, may be used as fluid filters (or parts thereof) in other applications including, but not limited to, liquid filtration, water purification, air filters in motorized vehicles, air filters in medical devices, air filters for household use, and the like. One skilled in the arts, with the benefit of this disclosure, should understand the necessary modification and/or limitations to adapt this disclosure for other filtration applications, e.g., size, shape, size ratio of matrix material components, and composition of matrix material components. By way of nonlimiting example, matrix materials could be molded to other shapes like hollow cylinders for a concentric water filter configuration or pleated sheets for an air filter.

In some embodiments, a system may include a material path with a mold cavity disposed along the material path, at least one hopper before at least a portion of the mold cavity for feeding a matrix material to the material path, a heat source in thermal communication with at least a first portion of the material path, and a cutter disposed along the material path after the first portion of the material path.

Some embodiments may include continuously introducing a matrix material into a mold cavity and disposing a release wrapper as a liner of the mold cavity. Further, said embodiments may include heating at least a portion of the matrix material so as to bind the matrix material at a plurality of contact points thereby forming a porous mass length and cutting the porous mass length radially thereby yielding a porous mass.

Some embodiments may include continuously introducing a matrix material into a mold cavity, heating at least a portion of the matrix material so as to bind the matrix material at a plurality of contact points thereby forming a porous mass length, and extruding the porous mass length through a die.

In some embodiments, a system may include a mold cavity comprising at least two mold cavity parts where a first conveyer includes a first mold cavity part and a second conveyer include a second mold cavity part. Said first conveyer and second conveyer may be capable of bringing together the first mold cavity part and the second mold cavity part to form the mold cavity and then separating the first mold cavity part from the second mold cavity part in a continuous fashion. The system may further include a hopper capable for filling the mold cavity with a matrix material and a heat source in thermal communication with at least a first portion of the mold cavity for transforming the matrix material into a porous mass.

Some embodiments may include introducing a matrix material into a plurality of mold cavities and heating the matrix material in the mold cavities so as to bind the matrix material at a plurality of contact points thereby forming a porous mass.

To facilitate a better understanding of the present invention, the following examples of representative embodiments are given. In no way should the following examples be read to limit, or to define, the scope of the invention.

EXAMPLES

Integrity Testing. To measure integrity, samples are placed in a French square glass bottle and shaken vigorously using a wrist action shaker for 5 minutes. Upon completion, the weight of the samples before and after shaking are compared. The difference is converted to a percent loss value. This test simulates deterioration under extreme circumstances. Less than 2% weight loss is assumed to be acceptable quality.

Porous mass samples were produced with GUR 2105 with carbon additive and GUR X192 with carbon additive were produced both with and without paper wrappings. Said samples were cylinders measuring 8 mm×20 mm. The results of the integrity test are given below in Table 1.

TABLE 1

| GUR | Carbon:GUR Ratio | Percent Loss (with paper) | Percent Loss (no paper) |
|---|---|---|---|
| 2105 | 85:15 | 0.94% | 2.64% |
| 2105 | 80:20 | 0.59% | 3.45% |
| 2105 | 75:25 | 0.23% | 0.57% |
| 2105 | 70:30 | 0.14% | 1.00% |
| X192 | 80:20 | 34.51% | 60.89% |
| X192 | 75:25 | 13.88% | 43.78% |
| X192 | 70:30 | 8.99% | 14.33% |
| plasticized carbon-on-tow filter | 4.01 mg/mm carbon | 0.98% | n/a |

This example demonstrates that increasing the percent of binder (GUR) in the porous mass and including a wrapper (paper) enhances the integrity of the porous mass. Further, porous masses can be designed to have comparable integrity to a Dalmatian filter (plasticized carbon-on-tow filter), which is used for increased removal of smoke components.

Particle Release. To measure the amount of particles released when a fluid is drawn through a filter (or porous mass), samples are dry puffed and the particles released are collected on a Cambridge pad.

The particle release characteristics of porous masses were compared to a Dalmatian filter (plasticized carbon-on-tow filter). Samples were cylinders measuring 8 mm×20 mm of (1) a porous mass with 333 mg of carbon, (2) a porous mass with 338 mg of carbon having been water washed, and (3) a Dalmatian filter with 74 mg of carbon. Table 2 below shows the results of the particle release test.

TABLE 2

| Sample | Initial Carbon Loading (mg) | mg Carbon/ mm filter length | Carbon Loss (mg) | mg Carbon Loss/ g Initial Carbon Loading |
|---|---|---|---|---|
| porous mass | 333 | 16.65 | 0.18 | 0.53 |
| washed porous mass | 338 | 16.9 | 0.073 | 0.22 |
| Dalmatian filter | 74 | 3.7 | 0.15 | 2.07 |

This example demonstrates that porous masses have comparable particle amounts that are released upon drawing as compared to Dalmatian filters even with many times more carbon loading, 4.5 times more in this example. Further, particle release can be mitigated with porous masses with treatments like washing. Other mitigating steps could be increasing the binder concentration in the porous mass, increasing the degree of mechanical binding in the porous mass (e.g., by increasing the time at binding temperatures), optimizing the size and shape of the additive (e.g., carbon), and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   continuously introducing a matrix material into a mold cavity, the matrix material comprising a plurality of active particles and a plurality of binder particles, wherein the binder particles have a melt flow index of less than about 3.5 g/10 min at 190° C. and 15 kg according to ASTM D1238, a bulk density of about 0.1 to about 0.5 g/cm$^3$, and either (1) a molecular weight of about 300,000 to less than 1,000,000 and an average particle size of about 5 microns to about 500 microns or (2) a molecular weight of about 1,000,000 to about 6,000,000 and an average particle size of about 200 microns to about 500 microns;
   heating at least a portion of the matrix material to about 175° C. to about 300° C. so as to bind the matrix material at a plurality of contact points thereby forming a porous mass length having an encapsulated pressure drop of about 10 mm of H$_2$O/mm of porous mass length or less; and
   cutting the porous mass length radially thereby yielding a porous mass.

2. The method of claim 1, wherein the mold cavity is formed by paper.

3. The method of claim 1, wherein continuously introducing the matrix material is indexed and a spacer is disposed between the indexed matrix material.

4. The method of claim 1, wherein heating is to a temperature at or above which at least a portion of the matrix material softens.

5. The method of claim 1, wherein the binder particles comprise at least one selected from the group consisting of ultrahigh molecular weight polyethylene, very high molecular weight polyethylene, high molecular weight polyethylene, a polyolefin, a polyester, a polyamide, a nylon, a polyacrylic, a polystyrene, a polyvinyl, polytetrafluoroethylene, polyether ether ketone, a non-fibrous plasticized cellulose, polyethylene, polypropylene, polybutylene, polymethylpentene, low-density polyethylene, linear low-density polyethylene, high-density polyethylene, polyethylene terephthalate, polybutylene terephthalate, polycyclohexylene dimethylene terephthalate, polytrimethylene terephthalate, polyacrylics, polymethyl methacrylate, polystyrene, acrylonitrile-butadiene-styrene, styrene-acrylonitrile, styrene-butadiene, styrene-maleic anhydride, ethylene vinyl acetate, ethylene vinyl alcohol, polyvinyl chloride, cellulose acetate, cellulose acetate butyrate, plasticized cellulosics, cellulose propionate, ethyl cellulose, any derivative thereof, any copolymer thereof, and any combination thereof.

6. The method of claim 1, wherein the active particles comprise at least one selected from the group consisting of: a nano-scaled carbon particle, a carbon nanotube having at least one wall, a carbon nanohorn, a bamboo-like carbon nanostructure, a fullerene, a fullerene aggregate, graphene, a few layer graphene, oxidized graphene, an iron oxide nanoparticle, a nanoparticle, a metal nanoparticle, a gold nanoparticle, a silver nanoparticle, a metal oxide nanoparticle, an alumina nanoparticle, a magnetic nanoparticle, a paramagnetic nanoparticle, a superparamagnetic nanoparticle, a gadolinium oxide nanoparticle, a hematite nanoparticle, a magnetite nanoparticle, a gado-nanotube, an endofullerene, Gd@C60, a core-shell nanoparticle, an onionated nanoparticle, a nanoshell, an onionated iron oxide nanoparticle, and any combination thereof.

7. The method of claim 1, wherein the matrix material comprises a ratio of the active particles to the binder particles of about 1 wt % active particles and about 99 wt % binder particles to about 99 wt % active particles and about 1 wt % binder particles.

8. The method of claim 1, wherein the porous mass has a void volume of about 40% to about 90%.

9. The method of claim 1, wherein the porous mass has an active particle loading of about 1 mg/mm to about 25 mg/mm.

10. The method of claim 1, wherein the porous mass has a carbon loading of about 6 mg/mm to about 25 mg/mm.

11. The method of claim 1, wherein the active particles comprise activated carbon and the binder particles comprise polyethylene, and wherein the matrix material comprises the active particles and the binder particles in a ratio of about 50:50 to about 90:10 by weight.

12. The method of claim 1, wherein the active particles comprise at least one selected from the group consisting of: activated carbon, an ion exchange resin, a desiccant, a silicate, a molecular sieve, a silica gel, activated alumina, a zeolite, perlite, sepiolite, Fuller's Earth, magnesium silicate, a metal oxide, iron oxide, and any combination thereof.

13. A method comprising:
   continuously introducing a matrix material into a mold cavity, the matrix material comprising a plurality of active particles and a plurality of binder particles;
   heating at least a portion of the matrix material so as to bind the matrix material at a plurality of contact points thereby forming a porous mass length, wherein the binder particles have a melt flow index of less than about 3.5 g/10 min at 190° C. and 15 kg according to ASTM D1238; and
   extruding the porous mass length through a die.

14. The method of claim 13, wherein heating is to a temperature at or above which at least a portion of the matrix material softens.

15. The method of claim 13, wherein the porous mass has a void volume of about 40% to about 90%.

16. The method of claim 13, wherein the porous mass has an active particle loading of about 1 mg/mm to about 25 mg/mm and an encapsulated pressure drop less than about 20 mm of water per mm length of porous mass.

17. The method of claim 13, wherein the porous mass has a carbon loading of about 6 mg/mm to about 25 mg/mm and an encapsulated pressure drop of about 20 mm of water or less per mm of length.

18. The method of claim 13, wherein the active particles comprise activated carbon and the binder particles comprise polyethylene, and wherein the matrix material comprises the active particles and the binder particles in a ratio of about 50:50 to about 90:10 by weight.

19. The method of claim 13, wherein the binder particles have a bulk density of about 0.1 to about 0.5 g/cm$^3$ and either (1) a molecular weight of about 300,000 to less than 1,000,000 and an average particle size of about 5 microns to about 500 microns or (2) a molecular weight of about 1,000,000 to about 6,000,000 and an average particle size of about 200 microns to about 500 microns.

20. The method of claim 13, wherein the porous mass length has an encapsulated pressure drop of about 20 mm of water or less per mm of length.

* * * * *